(12) United States Patent
Chen et al.

(10) Patent No.: US 12,217,761 B2
(45) Date of Patent: Feb. 4, 2025

(54) TARGET SPEAKER MODE

(71) Applicant: Zoom Video Communications, Inc., San Jose, CA (US)

(72) Inventors: Yuhui Chen, San Jose, CA (US); Qiyong Liu, Singapore (SG); Zhengwei Wei, Jiangxi (CN); Yangbin Zeng, Zhejiang (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/515,480

(22) Filed: Oct. 31, 2021

(65) Prior Publication Data
US 2023/0095526 A1   Mar. 30, 2023

(30) Foreign Application Priority Data
Sep. 24, 2021   (CN) ........................ 202111122227.X

(51) Int. Cl.
*G10L 17/08*   (2013.01)
*G10L 17/04*   (2013.01)
(Continued)

(52) U.S. Cl.
CPC .............. *G10L 17/08* (2013.01); *G10L 17/04* (2013.01); *G10L 25/21* (2013.01); *G10L 25/78* (2013.01)

(58) Field of Classification Search
CPC ......... G10L 17/08; G10L 17/04; G10L 17/02; G10L 25/21; G10L 25/78; G10L 21/0216; G10L 15/22; H04W 12/06; G06F 3/167
See application file for complete search history.

(56) References Cited

U.S. PATENT DOCUMENTS 8,078,463 B2 *  12/2011  Wasserblat .............. G10L 17/00
                                                        704/243
11,217,251 B2 *  1/2022  York ...................... G10L 15/22
(Continued)

FOREIGN PATENT DOCUMENTS

CN   112331181 A  *  2/2021  ............. G10L 25/18
CN   112562693 A  *  3/2021  ............. G10L 17/02

OTHER PUBLICATIONS

Zicheng Liu, Zhengyou Zhang, Li-Wei He, Phil Chou, Energy-Based Sound Source Localization and Gain Normalization for AD HOC Microphone Arrays, ICASSP, 2007, vol. II, pp. 761-764 (Year: 2007).*

(Continued)

*Primary Examiner* — Vijay B Chawan
*Assistant Examiner* — Nadira Sultana
(74) *Attorney, Agent, or Firm* — Kilpatrick Townsend & Stockton LLP

(57) ABSTRACT

Methods, systems, and apparatus, including computer programs encoded on computer storage media relate to a method for target speaker extraction. A target speaker extraction system receives an audio frame of an audio signal. A multi-speaker detection model analyzes the audio frame to determine whether the audio frame includes only a single-speaker or multiple speakers. When the audio frame includes only a single-speaker, the system inputs the audio frame to a target speaker VAD model to suppress speech in the audio frame from a non-target speaker based on comparing the audio frame to a voiceprint of a target speaker. When the audio frame includes multiple speakers, the system inputs the audio frame to a speech separation model to separate the voice of the target speaker from a voice mixture in the audio frame.

20 Claims, 21 Drawing Sheets

(51) Int. Cl.
    *G10L 25/21*     (2013.01)
    *G10L 25/78*     (2013.01)

(56) References Cited

U.S. PATENT DOCUMENTS

| | | | |
|---|---|---|---|
| 11,423,906 B2* | 8/2022 | Xu | G10L 21/0208 |
| 11,688,412 B2* | 6/2023 | Zhang | G06T 7/0012 |
| | | | 704/200 |
| 2021/0217182 A1* | 7/2021 | Li | G06V 20/46 |
| 2021/0280171 A1* | 9/2021 | Phatak | G06N 20/00 |
| 2021/0326421 A1* | 10/2021 | Khoury | G10L 17/08 |
| 2022/0301573 A1* | 9/2022 | Wang | G10L 17/02 |
| 2022/0366927 A1* | 11/2022 | Pishehvar | G06N 3/0464 |
| 2022/0383879 A1* | 12/2022 | Agarwal | G10L 17/04 |
| 2023/0068798 A1* | 3/2023 | Etchart | G06T 7/74 |

OTHER PUBLICATIONS

Wei Rao, Chenglin Xu, Eng Siong Chng, Haizhou Li, Target Speaker Extraction for Overlapped Multi-Talker Speaker Verification, arXiv: 1902.02546v1 [eess.AS] Feb. 7, 2019 (Year: 2019).*

Luo, Yi, and Nima Mesgarani. "Conv-tasnet: Surpassing ideal time-frequency magnitude masking for speech separation." IEEE/ACM transactions on audio, speech, and language processing 27, No. 8 (2019): 1256-1266.

EP International Search Report and Written Opinion for PCT/US2022/044616 malled Jan. 20, 2023.

\* cited by examiner

TARGET SPEAKER MODE

FIELD

This application relates generally to audio processing, and more particularly, to systems and methods for extracting the speech of a target speaker.

SUMMARY

The appended claims may serve as a summary of this application.

BRIEF DESCRIPTION OF THE DRAWINGS

The present disclosure will become better understood from the detailed description and the drawings, wherein.

DETAILED DESCRIPTION OF THE DRAWINGS

Figure 1A:
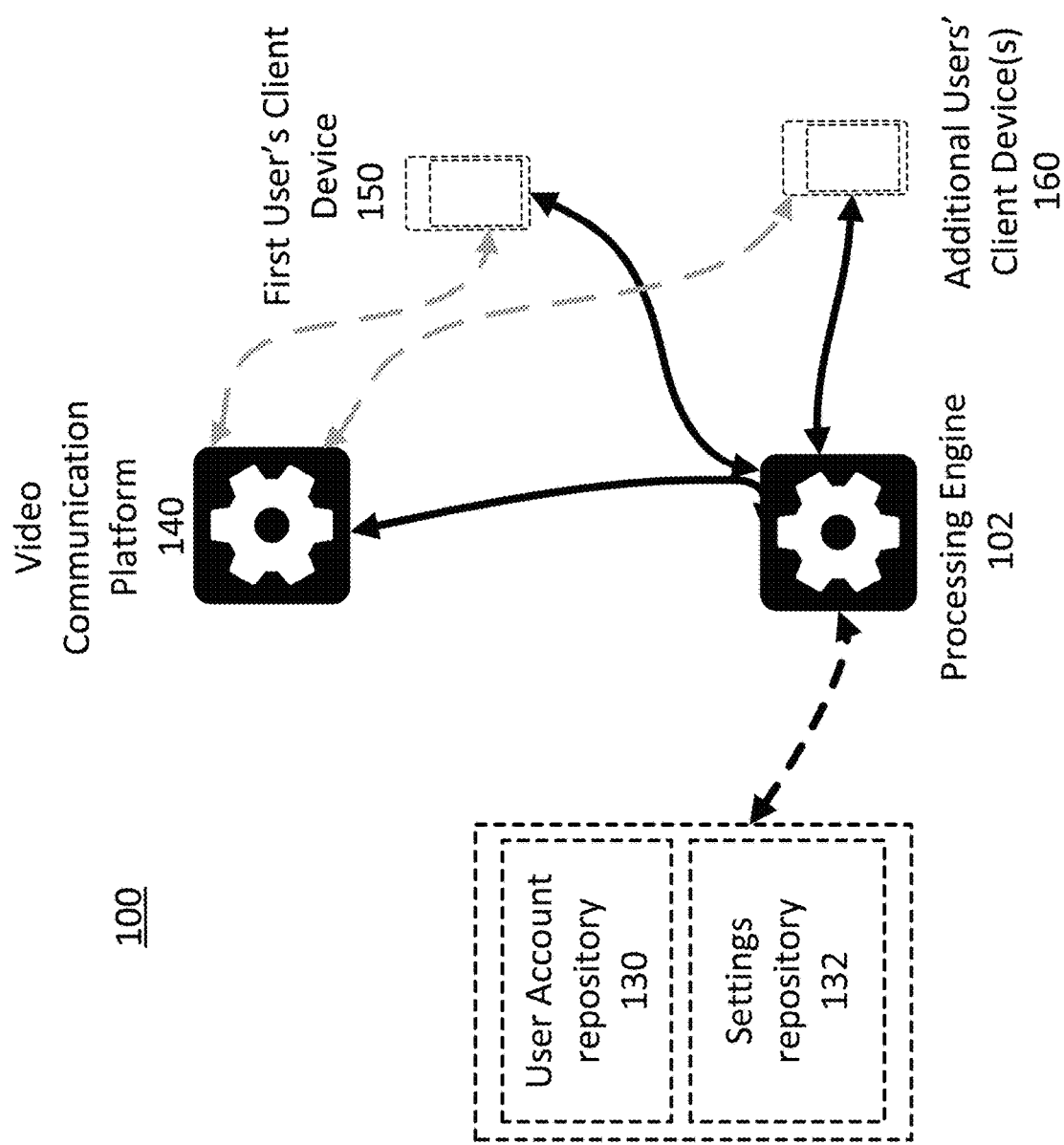
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

In general, one innovative aspect of the subject described in this specification can be embodied in systems, computer readable media, and methods that include operations for target speaker extraction. One system performs operations of receiving, by a target speaker extraction system, an audio frame of an audio signal, the target speaker extraction system comprising a multi-speaker detection model, a target speaker voice activity detection (VAD) model, and a speech separation model. The system analyzes, by the multi-speaker detection model, the audio frame to determine whether the audio frame includes only a single-speaker or multiple speakers. When the audio frame includes only a single-speaker, the system inputs the audio frame to the target speaker VAD model to suppress speech in the audio frame from a non-target speaker based on comparing the audio frame to a voiceprint of a target speaker. When the audio frame includes multiple speakers, the system inputs the audio frame to the speech separation model to separate the voice of the target speaker from a voice mixture in the audio frame.

In another aspect of the system, the system splits the audio signal into a plurality of audio frames.

In another aspect of the system, the system suppresses speech in the audio frame from the non-target speaker, by the target speaker VAD, based on a suppression ratio.

In another aspect of the system, the system generates a voiceprint of the non-target speaker. The system compares the voiceprint of the non-target speaker to the voiceprint of the target speaker to determine a similarity score. The system determines the suppression ratio based on the similarity score.

In another aspect of the system, the system receives a voice recording from a target speaker prior to a video conference. The system generates the voiceprint of the target speaker from the voice recording prior to the video conference. The system uses the target speaker extraction system and the voiceprint of the target speaker to extract the voice of the target speaker during the video conference.

In another aspect of the system, the system analyzes the audio signal to determine the energy of the audio signal, wherein the audio signal is received during a video conference. The system determines, based on the energy, that the target speaker is speaking and generates the voiceprint of the target speaker from the audio signal.

In another aspect of the system, determining, based on the energy, that the target speaker is speaking comprises determining that the energy exceeds a threshold.

In another aspect of the system, the target speaker extraction system is configured to be enabled and disabled based on user interface controls.

In another aspect of the system, the system generates, by a voiceprint extraction model, the voiceprint of the target speaker, wherein the voiceprint extraction model shares one or more weights with the speech separation model.

In another aspect of the system, the multi-speaker detection model comprises a convolutional neural network (CNN) classifier.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130 and/or a settings repository 132. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 800, 820, 840, 860, 1200, 1220, 1240 or other methods herein and, as a result, provide for a target speaker mode. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 160 may perform the methods 800, 820, 840, 860, 1200, 1220, 1240 or other methods herein and, as a result, provide for a target speaker mode. In some embodiments, this may be accomplished via communication with the first user's client device 150, additional users' client device(s) 160, processing engine 102, video communication platform 140, and/or other device(s) over a network between the device(s) and an application server or some other network server.

The first user's client device 150 and additional users' client device(s) 160 are devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 is configured to perform functions related to presenting and playing back video, audio, documents, annotations, and other materials within a video presentation (e.g., a virtual class, lecture, webinar, or any other suitable video presentation) on a video communication platform. The additional users' client device(s) 160 are configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130 and settings repository 132. The user account repository may store and/or maintain user account information associated with the video communication platform 140. In some embodiments, user account information may include sign-in information, user settings, subscription information, billing information, connections to other users, and other user account information. The settings repository 132 may store and/or maintain settings associated with the communication platform 140. In some embodiments, settings repository 132 may include target speaker mode settings, audio settings, video settings, video processing settings, and so on. Settings may include enabling and disabling one or more features, selecting quality settings, selecting one or more options, and so on. Settings may be global or applied to a particular user account.

Video communication platform 140 is a platform configured to facilitate video presentations and/or communication between two or more parties, such as within a video conference or virtual classroom.

Exemplary environment 100 is illustrated with respect to a video communication platform 140 but may also include other applications such as audio calls, audio recording, video recording, podcasting, and so on. Systems and methods herein for target speaker mode may be used in software applications for audio calls, audio recording, video recording, podcasting, and other applications in addition to or instead of video communications.

Figure 1B:
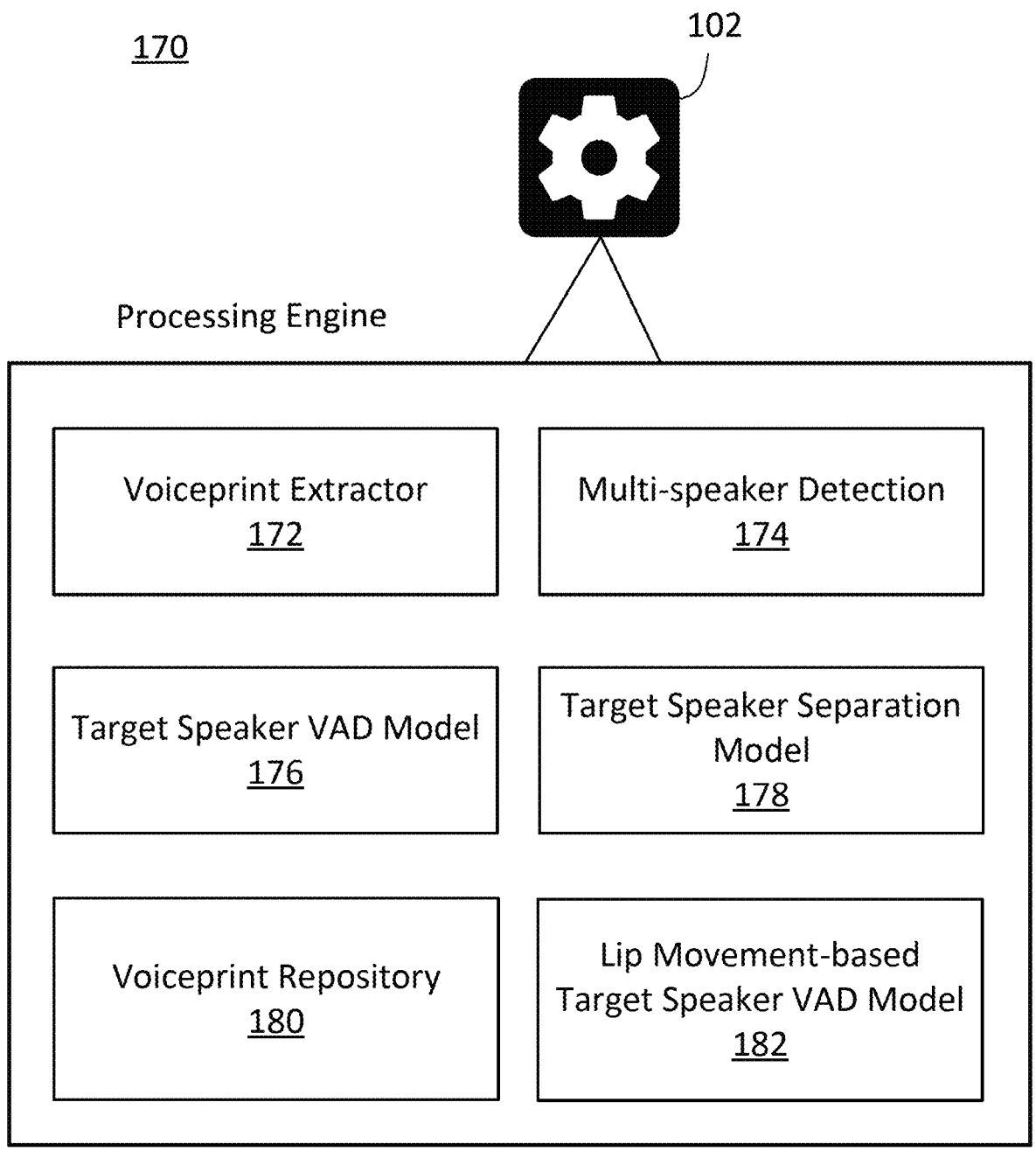
FIG. 1B is a diagram illustrating an exemplary computer system with software modules that may execute some of the functionality described herein.

FIG. 1B is a diagram illustrating an exemplary computer system 170 with software modules that may execute some of the functionality described herein. Software modules may enable a target speaker mode, where a target speaker extraction system extracts the speech of a target speaker while reducing or removing the speech of other speakers.

Voiceprint extractor 172 provides system functionality for extracting a voiceprint from an audio recording. A voiceprint may comprise a digital representation of voice characteristics of a speaker. In some embodiments, a voiceprint may be used to identify whether the speaker in an audio recording is the target speaker or not, based on comparison of the voice characteristics of the audio recording to a voiceprint of the target speaker. In some embodiments, a voice print may comprise an embedding. Voiceprint extractor 172 may comprise a machine learning (ML) model, such as one or more neural networks, CNNs, deep neural networks (DNNs), or other ML models, for voiceprint extraction. Voiceprint extractor 172 may include one or more parameters, such as internal weights of a neural network, that may determine the operation of voiceprint extractor 172.

Multi-speaker detection module 174 provides system functionality for determining whether one speaker or multiple speakers are speaking in an audio recording. In some embodiments, the multi-speaker detection module 174 receives as input an audio frame of limited length, such as 10 ms, and the multi-speaker detection module 174 determines whether one speaker or multiple speakers are speaking in the audio frame. The multi-speaker detection module 174 may be used to process a plurality of audio frames to determine for each frame whether one speaker or multiple speakers are speaking in the audio frame. In some embodiments, output of the multi-speaker detection module 174 may comprise a binary classification of whether one speaker is speaking or multiple speakers are speaking. Multi-speaker detection module 174 may comprise a classifier, such as a binary classifier. In an embodiment, multi-speaker detection module 174 may comprise a ML model, such as one or more neural networks, CNNs, DNNs, or other ML models. Multi-speaker detection module 174 may include one or more parameters, such as internal weights of a neural network, that may determine the operation of multi-speaker detection module 174.

Target speaker VAD model 176 provides system functionality for determining whether an audio recording contains the target speaker's voice or not. In an embodiment, the target speaker VAD model 176 may process an audio recording that has been determined by the multi-speaker detection module 174 to only contain speech from a single user. The target speaker VAD model 176 may compare the audio recording to a target speaker's voiceprint to determine whether the audio recording contains the target speaker's voice or not. In some embodiments, the output of the target speaker VAD model 176 may be a binary classification of whether the target speaker is speaking or not. Target speaker VAD model 176 may comprise a classifier, such as a binary classifier. In some embodiments, the output of the target speaker VAD model 176 may be a ratio, such as between 0 and 1, based on how likely it is that the recording contains the target speaker's voice, where a higher ratio may indicate that it is more likely that it comprises the target speaker's voice. In some embodiments, the target speaker VAD model 176 receives as input an audio frame. Target speaker VAD model 176 may process a plurality of audio frames to determine for each frame whether it contains the target speaker's voice or not. In an embodiment, target speaker VAD model 176 may comprise a ML model, such as one or more neural networks, CNNs, DNNs, or other ML models. Target speaker VAD model 176 may include one or more parameters, such as internal weights of a neural network, that may determine the operation of target speaker VAD model 176.

Target speaker separation model 178 provides system functionality for target speaker separation, which comprises separating speech from the target speaker from a mixture of speech from multiple speakers in an audio recording. In an embodiment, the input to the target speaker separation model 178 comprises an audio recording containing speech from multiple speakers, and the output comprises an audio recording with just the speech from the target speaker. In one embodiment, the target speaker separation model 178 uses the target speaker's voiceprint for target speaker separation. In some embodiments, the target speaker separation model 178 receives as input an audio frame. Target speaker separation model 178 may process a plurality of audio frames to generate a plurality of audio frames containing only the target speaker's speech. In an embodiment, target speaker separation model 178 may comprise a ML model, such as one or more neural networks, CNNs, DNNs, or other ML models. Target speaker separation model 178 may include one or more parameters, such as internal weights of a neural network, that may determine the operation of target speaker separation model 178.

Voiceprint repository 180 may comprise a repository, dataset, or database of one or more voiceprints for one or more target speakers. In some embodiments, the voiceprint repository 180 comprises voiceprints for only a single target speaker. For example, the target speaker may comprise the user of a user account in video communication platform 140. In some embodiments, the voiceprint repository 180 may comprise voiceprints for a plurality of target speakers, such as multiple users who share or use the same user account in video communication platform 140. The voiceprint repository 180 may comprise one voiceprint per user or may comprise a plurality of voiceprints per user. For example, voiceprint repository 180 may include a plurality of voiceprints for each user that are collected under different conditions, such as the user saying different words or phrases, speaking in different rooms or environmental conditions, using different recording equipment, and so on, to capture variations in the user's voice characteristics.

Lip movement (LM) based target speaker VAD model 182 provides system functionality for determining whether an audio recording contains the target speaker's voice or not based on detecting movement of a user's lips from video. In an embodiment, the LM-based target speaker VAD model 182 may process an audio recording that has been determined by the multi-speaker detection module 174 to only contain speech from a single user. LM-based target speaker VAD model 182 may analyze video captured from the camera of client device 150 during the recording of the audio recording to determine whether the lips of a user in the video are moving or not. When it is determined that the lips are moving, then LM-based target speaker VAD model 182 may output a result that the target speaker is speaking. When it is determined that the lips are not moving, then LM-based target speaker VAD model 182 may output a result that the target speaker is not speaking. The user captured in the video recording may be set as the target speaker by the LM-based target speaker VAD model 182. In some embodiments, the LM-based target speaker VAD model 182 analyzes key points on the user's lips to determine if their movement exceeds a threshold. In some embodiments, LM-based target speaker VAD model 182 may comprise a ML model for analyzing video to detect lip movement, such as one or more neural networks, CNNs, DNNs, or other ML models. LM-based target speaker VAD model 182 may include one or more parameters, such as internal weights of a neural network, that may determine the operation of LM-based target speaker VAD model 182.

Figure 2:
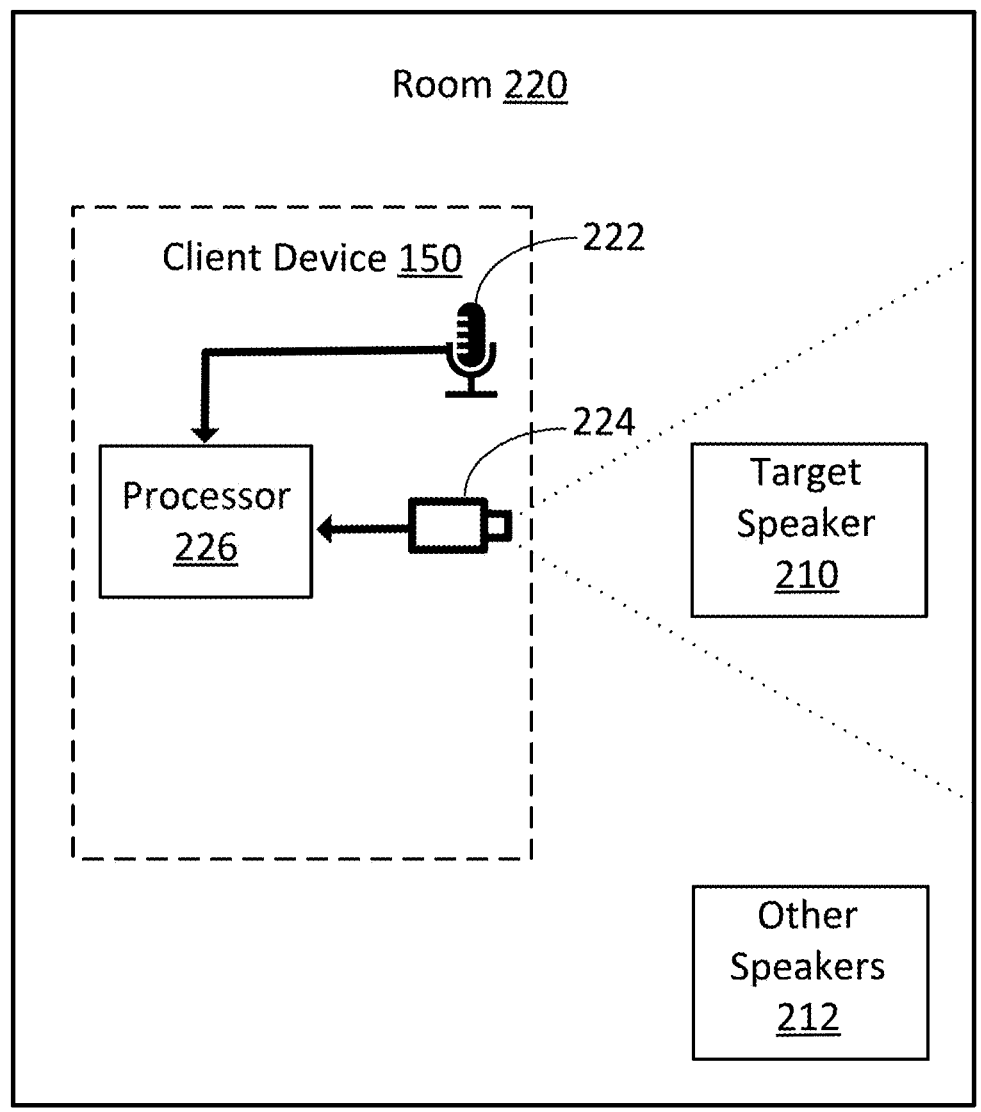
FIG. 2 is a diagram illustrating an exemplary environment in which some embodiments may operate.

FIG. 2 is a diagram illustrating an exemplary environment 200 in which some embodiments may operate.

Target speaker 210 comprises a user of video communication platform 140 who is speaking in a room 220. For example, target speaker 210 may comprise a participant in a video conference or may be presenting a presentation or class via video communication platform 140. Client device 150 includes microphone 222 and camera 224, which capture audio from the target speaker 210 and video of the target speaker 210, respectively, for transmitting in the video conference. Other speakers 212 comprise one or more additional speakers in room 220, or the nearby environment, whose speech may also be captured by the microphone 222. For example, other speakers 212 may comprise coworkers, family members, or other people in the environment. In some cases, other speakers 212 are in the field of view of camera 224 and captured by the video recording, and, in other cases, other speakers are out of the field of view of camera 224 and are not captured by the video recording.

Since speech from both the target speaker 210 and other speakers 212 may be captured by the microphone 222 and transmitted by the video communication platform 140 to other users in the video conference, the resulting audio recording may be garbled or difficult to understand due to the target speaker 210 and other speakers 212 talking over each other or may be distracting due to speech from other speakers 212. Methods and systems herein may be used to reduce or remove the speech from other speakers 212 so that only the speech from target speaker 210 remains in the audio recording for the video conference, and other users in the video conference do not hear the other speakers 212. A target speaker extraction system may extract the target speaker's speech from the audio recording so that speech from other speakers 212 in the audio recording is filtered, removed, or reduced. In an embodiment, the target speaker 210 comprises a user of video communication platform 140, such as a user of a user account on the video communication platform 140, and other speakers 212 comprise other speakers in the environment with the user who are not participating in a video conference on the video communication platform 140. Other users 212 may comprise, for example, non-users of the video communication platform 140. Exemplary applications include keeping only the user's speech when a user is participating in a video conference in a noisy office where other coworkers are talking or when the user is giving a lecture or presentation and other people in the lecture hall are also talking.

The target speaker extraction system may be enabled and disabled by enabling and disabling an associated target speaker mode using one or more user interface controls, such as user menus or buttons. When target speaker mode is enabled, then target speaker extraction system may extract the target speaker's speech. When target speaker mode is disabled, then target speaker extraction system may be disabled from performing target speaker extraction.

Exemplary environment 200 is illustrated with respect to a video communication platform 140 but target speaker 210 may also be using other applications such as audio calls, audio recording, video recording, podcasting, and so on where systems and methods herein may be used to perform target speaker extraction.

II. Exemplary Voiceprint-Based System

Figure 3:
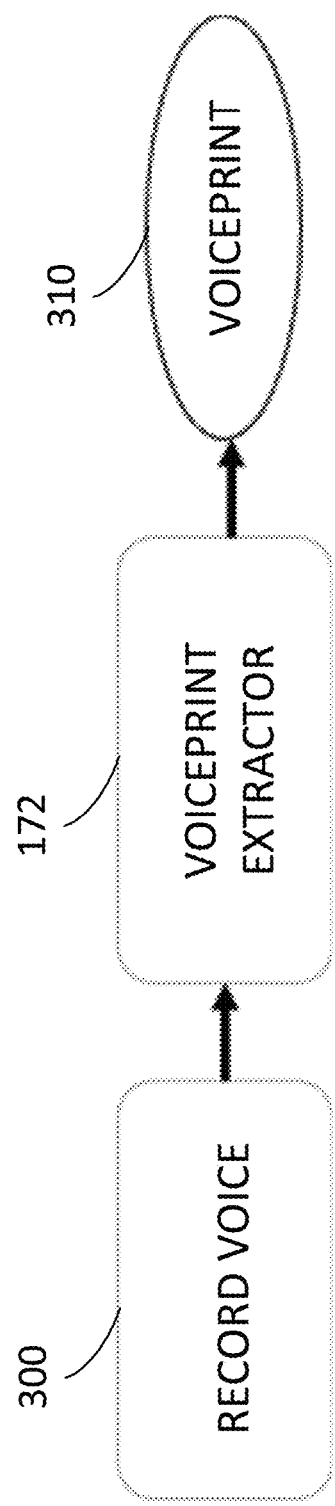
FIG. 3 is a diagram illustrating an exemplary voiceprint extractor according to one embodiment of the present disclosure.

FIG. 3 is a diagram illustrating an exemplary voiceprint extractor 172 according to one embodiment of the present disclosure.

A user provides a recorded voice 300. In some embodiments, a target speaker extraction system may prompt the user to provide recorded voice 300 during a configuration mode, such as after a target speaker mode is enabled or before a video conference. For example, when the target speaker mode is enabled or when the user is about to join a video conference, the target speaker extraction system may prompt the user to record their voice for use in target speaker extraction. The target speaker extraction system may display a configuration screen with one or more predefined phrases and prompt the user to say the phrases. Alternatively, the target speaker extraction system may prompt the user to say a phrase of his or her choosing. In some embodiments, the recorded voice 300 of the user is 5-10 seconds long. The target speaker system may then record audio of the user speaking, which may comprise recorded voice 300.

Alternatively, target speaker extraction system may record user's voice during a video conference to obtain recorded voice 300 without requesting the user to provide a recorded voice sample in a separate configuration mode. In one embodiment, target speaker extraction system analyzes an audio recording to the determine the energy of the audio recording and, based on the energy, determines that the target speaker is speaking and records the speech as recorded voice 300, as described further herein. In one embodiment, target speaker extraction system analyzes video of the user to identify movement of the user's lips and, based on the movement of the user's lips, determines that the target speaker is speaking and records the speech as recorded voice 300, as described further herein.

Voiceprint extractor 172 receives and processes recorded voice 300 and generates voiceprint 310 based on the voice characteristics of recorded voice 300. The voice characteristics may comprise features of a person's voice that distinguish the voice from the voices of other people and may be dependent on physical features such as the shape and size of a speaker's vocal tract. Voiceprint extractor 172 may comprise an ML model, such as one or more neural networks, CNNs, DNNs, or other ML models, for voiceprint extraction. Voiceprint extractor 172 may include one or more parameters, such as internal weights of a neural network, that may determine the operation of voiceprint extractor 172. The parameters of voiceprint extractor 172 may be learned through training the voiceprint extractor 172 on one or more training samples, which may comprise updating the parameters based on gradient-based optimization.

Voiceprint 310 may comprise a digital representation of voice characteristics of a speaker. In some embodiments, voiceprint 310 may comprise an embedding and may also be called a target speaker embedding. In some embodiments, embeddings may comprise a low-dimensional, learned vector representations that may be used to generate higher-dimensional vector representations of information. In some embodiments, embeddings encode information in a compressed, space-efficient format. For example, the voiceprint 310 may represent information with a vector representation that is smaller than the recorded voice 300 that is input to the voiceprint extractor 172. Embeddings may be lossy and may lose some amount of data in the process of encoding.

In an embodiment, voiceprint 310 may be stored associated in the user account of the user along with other user data.

Figure 4:
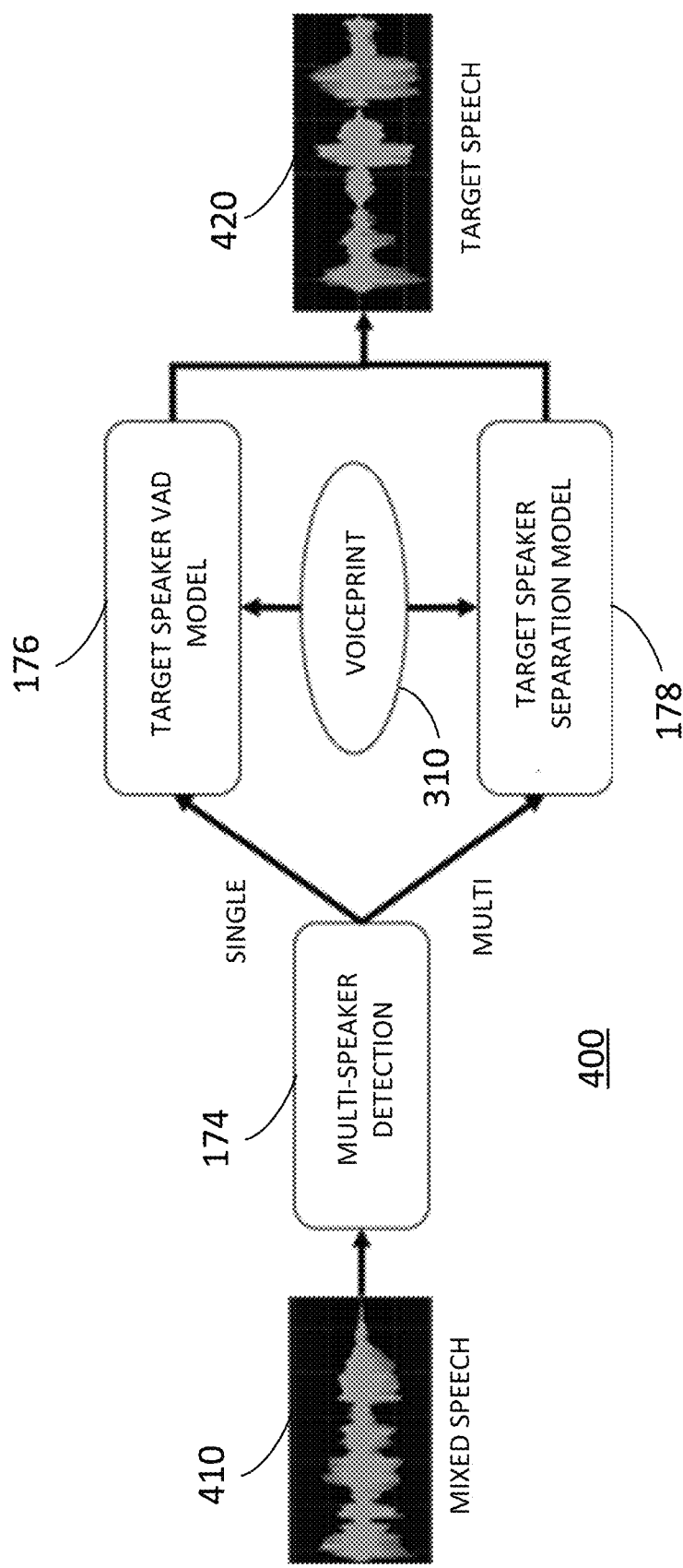
FIG. 4 is a diagram illustrating an exemplary target speaker extraction system according to one embodiment of the present disclosure.

FIG. 4 is a diagram illustrating an exemplary target speaker extraction system 400 according to one embodiment of the present disclosure.

Prior to use, the target speaker extraction system 400 may check that target speaker voiceprint 310 is provided. When target speaker voiceprint 310 does not exist, then target speaker extraction system 400 may skip performing target speaker extraction and the audio recording 410 may be unmodified. When target speaker voiceprint 310 is available, then target speaker extraction system 400 may perform target speaker extraction on audio recording 410.

Audio recording 410 is received, which may comprise speech from the target speaker 210 and other speakers 212. An audio segmenter may be applied to audio recording 410 to divide the audio recording 410 into one or more segments, called audio frames. Audio frames may comprise short segments of the audio recording. In some embodiments, audio segmenter may divide the audio recording 410 at predefined intervals, such as every 10 ms, to generate the audio frames. In other embodiments, audio segmenter may generate audio frames based on characteristics of the audio recording 410. Audio frames may be processed sequentially by the target speaker extraction system 400 and recombined after processing into target speech 420.

Each audio frame may be analyzed by a VAD model that detects whether any speech is present in the audio frame. When no speech is present in the audio frame, then processing may stop and the system may leave the audio frame unmodified. For example, the audio frame may contain only silence or background noise. When the VAD model detects that speech is present in the audio frame, then the audio frame may be input to the multi-speaker detection model 174. In some embodiments, the audio frame may be encoded by an encoder into an audio signal representation, such as a spectrogram, using, for example, Short-time Fourier Transform (STFT), filter banks, or other methods.

Multi-speaker detection model 174 processes the audio frame to determine whether one speaker or multiple speakers are speaking in the audio frame. Multi-speaker detection model 174 analyzes the audio frame and based on features of the audio frame, such as the consistency or distribution of characteristics of the speech in the audio frame, areas of silence or breaks in speech, overlapping speech, and other features, determine whether one speaker or multiple speakers are speaking in the audio frame. Output of the multi-speaker detection module 174 may comprise a binary classification of whether one speaker is speaking or multiple speakers are speaking. In an embodiment, multi-speaker detection module 174 may comprise a ML model, such as one or more neural networks, CNNs, DNNs, or other ML models. Multi-speaker detection module 174 may include one or more parameters, such as internal weights of a neural network, that may determine the operation of multi-speaker detection module 174. The parameters of multi-speaker detection model 174 may be learned through training the multi-speaker detection model 174 on one or more training samples, which may comprise updating the parameters based on gradient-based optimization. For example, the multi-speaker detection model 174 may be trained with supervised learning based on a first plurality of training samples where one speaker is speaking and a second plurality of training samples where multiple speakers are speaking.

When multi-speaker detection model 174 determines that one speaker is speaking in the audio frame, then the audio frame is input to target speaker VAD model 176. Target speaker VAD model 176 may determine whether the audio frame contains the target speaker's voice or not by comparing the audio frame to the target speaker's voiceprint 310. When the audio frame contains the target speaker's voice then the speech in the audio frame is kept intact, but when the audio frame contains a non-target speaker's voice then the speech is suppressed.

When multi-speaker detection model 174 determines that multiple speakers are speaking in the audio frame, then the audio frame is input to target speaker separation model 178 to separate the target speaker's speech from the voice mixture in the audio frame. The target speaker separation model 178 may process the audio frame using a speech separation model, which may use the target speaker's voiceprint 310.

The output from target speaker VAD model 176 and target speaker separation model 178 comprises an audio frame where the target speaker's voice has been extracted by reducing or removing speech from non-target speakers. Each of the audio frames processed by the system may be joined to generate target speech 420, which comprises the complete audio recording where the target speaker's voice has been extracted and speech of non-target speakers is suppressed. When the audio frames have been encoded into an audio signal representation, then the audio frames may be decoded after target speaker extraction, by a decoder, into playable audio.

In an embodiment, target speaker extraction system 400 provides real-time processing of audio by using multi-speaker detection module 174 to route audio frames to either the target speaker VAD model 176 or target speaker separation model 178. Target speaker VAD model 176 may comprise a smaller ML model with fewer parameters and faster processing than the target speaker separation model 178. Comparison of an audio frame with the voiceprint 310 may be performed quickly by target speaker VAD model 176. Therefore, multi-speaker detection module 174 routing audio frames to the target speaker VAD model 176 when possible can improve performance of the system. In some embodiments, processing time of target speaker extraction system 400 is less than 10 ms, which can be suitable for real-time systems.

Figure 5A:
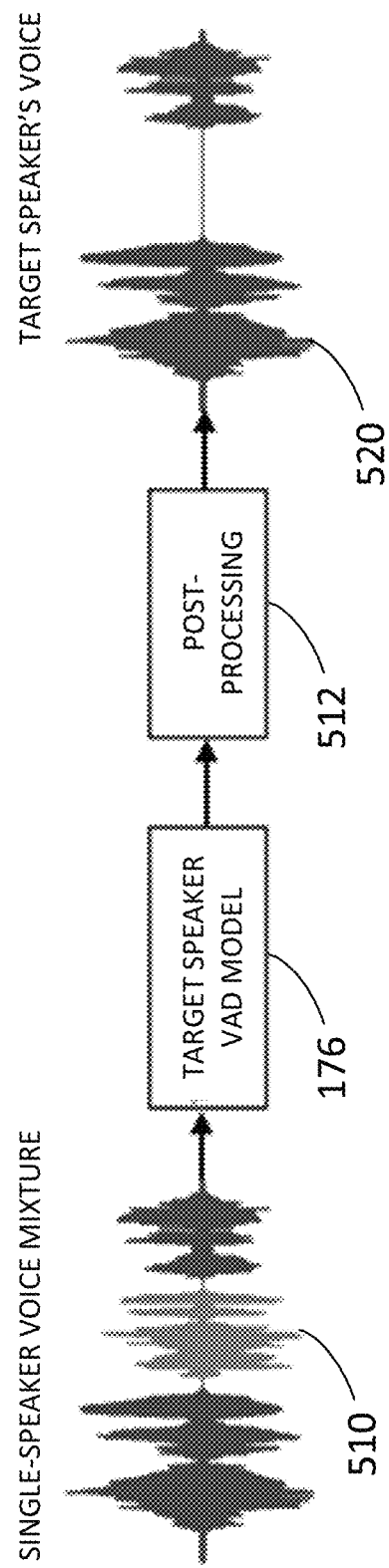
FIG. 5A is a diagram illustrating an exemplary target speaker VAD model according to one embodiment of the present disclosure.

FIG. 5A is a diagram illustrating an exemplary target speaker VAD model 176 according to one embodiment of the present disclosure.

Audio recording 510 may be input to target speaker VAD model 176 to determine which portions of the audio recording 510 contain the target speaker's voice and which portions contain a non-target speaker's voice. In an embodiment, audio recording 510 is segmented into a plurality of audio frames that are processed by the target speaker VAD model 176 one at a time. For example, each audio frame may be processed by multi-speaker detection model 174, and each audio frame that contains only a single speaker is transmitted to the target speaker VAD model 176.

In an embodiment, the target speaker VAD model 176 receives as input an audio frame. The target speaker VAD model 176 may compare the audio frame to a target speaker's voiceprint 310 to determine whether the audio frame contains the target speaker's voice or not. The target speaker VAD model 176 analyzes the audio frame and compares the characteristics of the voice in the audio frame to the target speaker's voiceprint. In some embodiments, the target speaker VAD model 176 may input the audio frame to voiceprint extractor 172 to generate a voiceprint and compare the voiceprint to the target speaker's voiceprint to determine the amount of similarity. In some embodiments, target speaker VAD model 176 may accept as input both the audio frame and target speaker's voiceprint 310 and determine the amount of similarity based on a ML model.

In an embodiment, target speaker VAD model 176 may comprise a ML model, such as one or more neural networks, CNNs, DNNs, or other ML models. Target speaker VAD model 176 may include one or more parameters, such as internal weights of a neural network, that may determine the operation of target speaker VAD model 176. The parameters of target speaker VAD model 176 may be learned through training the target speaker VAD model 176 on one or more training samples, which may comprise updating the parameters based on gradient-based optimization. For example, the target speaker VAD model 176 may be trained with supervised learning based on a first plurality of training samples where the target speaker is speaking and a second plurality of training samples where non-target speakers are speaking.

In some embodiments, the output of the target speaker VAD model 176 may be a binary classification of whether the target speaker is speaking or not. In some embodiments, the output of the target speaker VAD model 176 may be a ratio, such as between 0 and 1, based on how likely it is that the recording contains the target speaker's voice, where a higher ratio means that it is more likely that it comprises the target speaker's voice.

Post-processing module 512 may use the output of the target speaker VAD model 176 to post-process the audio frame to suppress speech of a non-target speaker. When the target speaker VAD model 176 determines that the audio frame contains speech by the target speaker, then post-processing module 512 may perform no post-processing and the audio frame is unmodified. When the target speaker VAD model 176 performs a binary classification and determines that the audio frame includes speech from a non-target speaker, then post-processing module 512 may reduce the magnitude of the speech in the audio frame to zero so that the speech is completely suppressed. Alternatively, the post-processing module 512 may reduce the magnitude of the speech in the audio frame by a suppression ratio, such 0.1, 0.25, 0.5, and so on, so that the speech is quieter. For example, the magnitude of the output speech from post-processing module 512 may be determined by multiplying the original magnitude of speech in the audio frame by the suppression ratio. This approach may be desirable to avoid inappropriately silencing speech of the target speaker if the target speaker VAD model 176 makes a mistaken classification. In some embodiments, target speaker VAD model 176 outputs a ratio based on how likely it is that the recording contains the target speaker's voice. Post-processing module 512 may determine the suppression ratio based on this ratio. In an embodiment, post-processing module 512 may use this ratio, or one minus this ratio, as the suppression ratio so that speech that is more dissimilar to the target speaker's voice is more suppressed and speech that is more similar to the target speaker's voice is less suppressed.

Post-processed audio frames are output by the post-processing module 512 and may be joined together in temporal order to reconstruct a target speaker audio recording 520 that has now suppressed speech from non-target speakers.

Figure 5B:
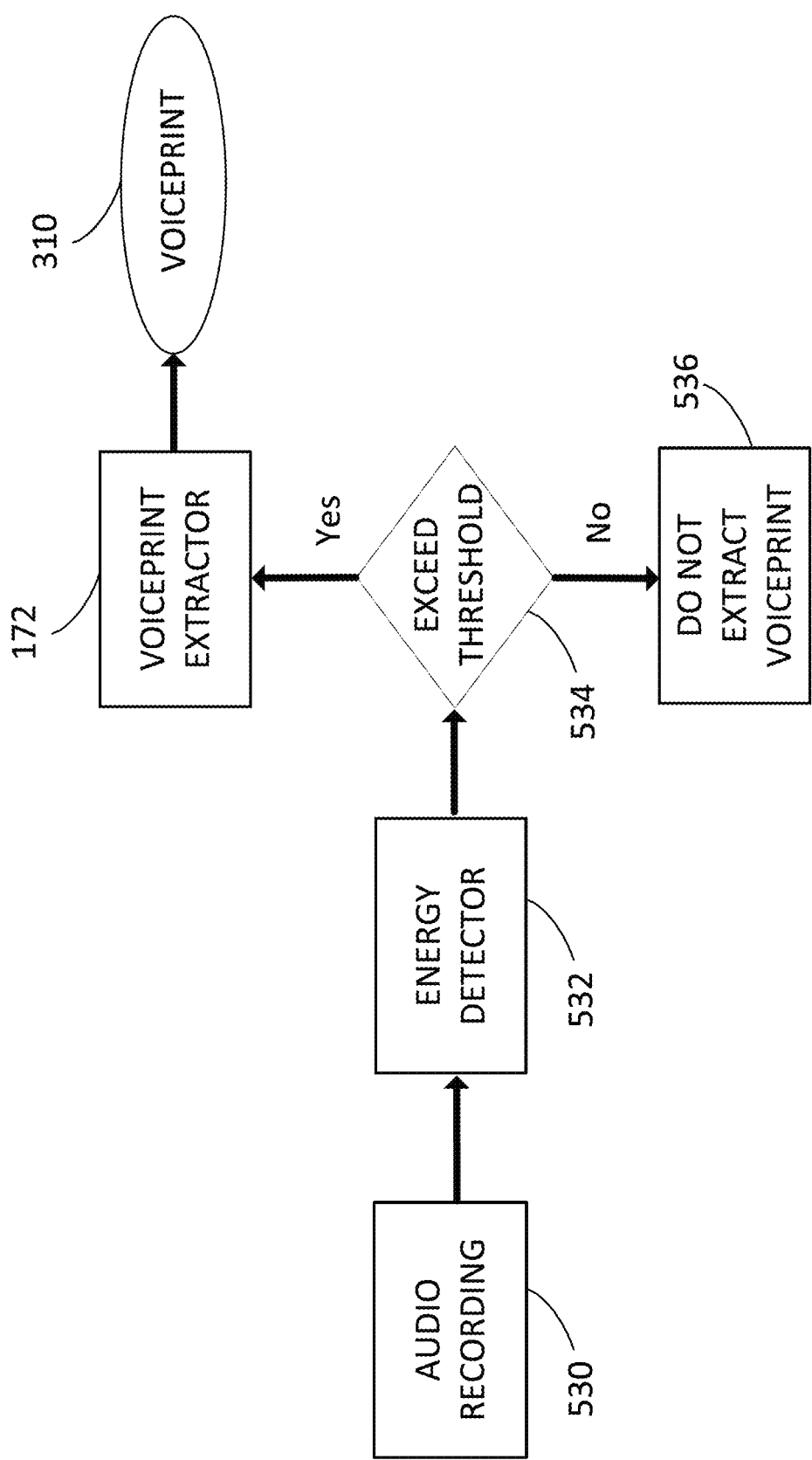
FIG. 5B is a diagram illustrating target speaker voiceprint extraction based on energy according to one embodiment of the present disclosure.

FIG. 5B is a diagram illustrating target speaker voiceprint extraction based on energy according to one embodiment of the present disclosure.

In an embodiment, target speaker extraction system 400 may be used to extract the target speaker's voiceprint during a video conference without needing to separately extract the voiceprint during a configuration mode. This process may enable a user to use target speaker mode without having to perform a separate configuration process to record his or her voice. Target speaker extraction system 400 may receive an audio recording 530 that is received during a video conference or is recorded before a video conference. In one aspect of the system, the system analyzes the audio recording 530 to determine the energy of the audio recording 530. The system determines, based on the energy, that the target speaker is speaking, when the energy exceeds a threshold, and generates a voiceprint of the target speaker from the audio recording 530.

In an embodiment, multi-speaker detection module 174 processes audio recording 530 and determines that it contains speech from a single speaker. For example, multi-speaker detection module 174 may process a plurality of audio frames of audio recording 530 and determine that they each comprise speech of a single speaker, which may determine that the audio recording 530 contains speech of a single speaker. If the multi-speaker detection module 174 determines that multiple speakers are speaking in audio recording 530, then the target speaker extraction system 400 may determine not to extract the target speaker's voiceprint from audio recording 530.

Target speaker extraction system 400 may analyze the audio recording 530 to determine the energy of the audio recording 530, where the audio recording 530 is received during a video conference or before a video conference. Target speaker extraction system 400 may determine, based on the energy, that the target speaker is speaking and generate the target speaker's voiceprint 310 from the audio recording 530. When the target speaker extraction system 400 determines, based on the energy, that the target speaker is not speaking then it does not generate the target speaker's voiceprint 310 from the audio recording 530. In an embodiment, an audio recording with high energy may indicate that the speaker is close to the microphone and therefore that the speaker is the target speaker, while an audio recording with low energy may indicate that the speaker is farther from the microphone and therefore that the speaker is likely to be a non-target speaker in the background.

In an embodiment, energy detector 532 analyzes the audio recording 530 to determine the energy of the audio recording 530. The amount of energy in audio recording 530 is compared to an energy threshold (step 534), which may comprise a predefined threshold amount of energy. In some embodiments, the energy threshold may be configurable. In some embodiments, the energy threshold may be learned through machine learning. When the energy in audio recording 530 exceeds the energy threshold, then the audio recording 530 is input to voiceprint extractor 172 to generate the target speaker's voiceprint 310. However, when the energy in audio recording 530 does not exceed the energy threshold, then the voiceprint is not extracted (step 536).

Figure 5C:
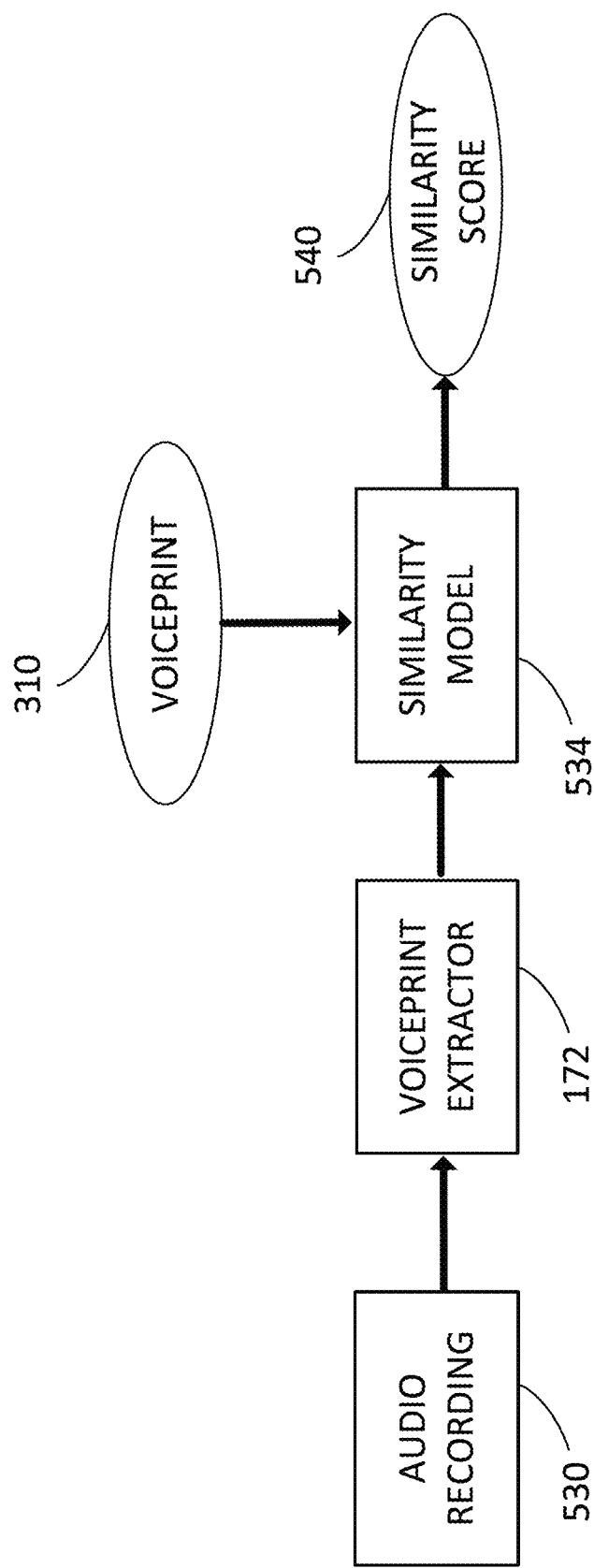
FIG. 5C is a diagram illustrating determining a similarity score between an audio recording and the target speaker's voice print according to one embodiment of the present disclosure.

FIG. 5C is a diagram illustrating determining a similarity score between an audio recording, such as an audio frame, and the target speaker's voice print according to one embodiment of the present disclosure.

In an embodiment, target speaker extraction system 400 may determine the amount of similarity between speech in an audio frame and the target speaker's voiceprint to determine a suppression ratio. In an embodiment, an audio frame (e.g., audio recording 530) and target speaker voiceprint 310 are provided. Audio frame may be input to voiceprint extractor 172 to generate a voiceprint of the audio frame. The voiceprint of the audio frame and target speaker's voiceprint 310 may be input to a similarity model 534. Similarity model 534 processes the two voiceprints to determine their similarity and generate a similarity score 540. Similarity score 540 may comprise a numerical value that measures how similar the two voiceprints are. In some embodiments, the similarity score 540 may vary in the range 0 to 1, where 0 indicates high dissimilarity and 1 indicates high similarity. In an embodiment, the suppression ratio used by target speaker VAD model 176 may be determined based on the similarity score. For example, the suppression ratio may comprise the similarity score or one minus the similarity score.

In one embodiment, similarity model 534 computes the cosine similarity between the voiceprint of the audio frame and target speaker voiceprint 310, where both the voiceprints comprise vectors and the cosine similarity comprises a measure of the cosine of the angle between the two vectors. In some embodiments, similarity model 534 may comprise a ML model, such as one or more neural networks, CNNs, DNNs, or other ML models. Similarity model 534 may include one or more parameters, such as internal weights of a neural network, that may determine the operation of similarity model 534. The parameters of similarity model 534 may be learned through training the similarity model 534 on one or more training samples, which may comprise updating the parameters based on gradient-based optimization. For example, the similarity model 534 may be trained with supervised learning based on a first plurality of training samples where the pair of input voiceprints are similar and a second plurality of training samples where the pair of input voiceprints are dissimilar.

In some embodiments, the process illustrated in FIG. 5C may be performed by target speaker VAD model 176 and similarity model 534 may comprise a component of target speaker VAD model 176.

Figure 6:
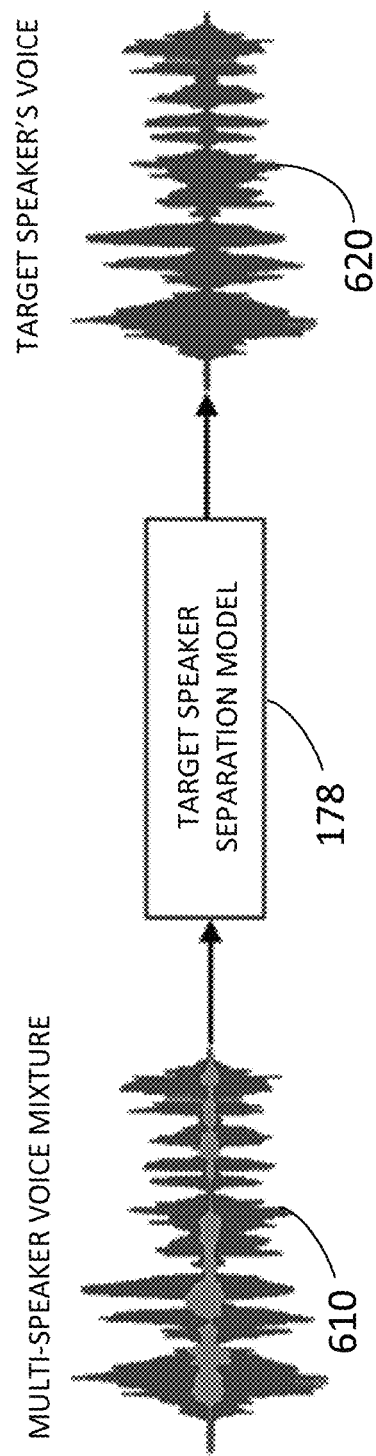
FIG. 6 is a diagram illustrating an exemplary target speaker separation model according to one embodiment of the present disclosure.

FIG. 6 is a diagram illustrating an exemplary target speaker separation model 178 according to one embodiment of the present disclosure.

Audio recording 610 may be input to target speaker separation model 178 to separate the target speaker's voice from audio recording 610 that contains a voice mixture from multiple speakers. In an embodiment, audio recording 610 is segmented into a plurality of audio frames that are processed by the target speaker separation model 178 one at a time. For example, each audio frame may be processed by multi-speaker detection model 174, and each audio frame that contains multiple speakers is transmitted to the target speaker separation model 178.

In an embodiment, the target speaker separation model 178 receives as input an audio frame. Target speaker separation model 178 performs speech separation on the audio frame to separate the target speaker's voice from the voice mixture in the audio frame. The target speaker separation model 178 may use the target speaker's voiceprint 310 for speech separation and for identifying the target speaker's voice in the voice mixture. The target speaker separation model 178 may predict which parts of the voice mixture in the audio frame come from the target speaker and which do not and retain only the parts of the voice mixture from the target speaker. In some embodiments, the target speaker separation model 178 decomposes the voice mixture into a plurality of speech signals, each speech signal from a different speaker in the voice mixture. This process may separate the voice mixture into speech from different sources. In some embodiments, speech separation may also include separating non-speech noise from the voice mixture.

In an embodiment, target speaker separation model 178 may comprise a ML model, such as one or more neural networks, CNNs, DNNs, or other ML models. Target speaker separation model 178 may include one or more parameters, such as internal weights of a neural network, that may determine the operation of target speaker separation model 178. The parameters of target speaker separation model 178 may be learned through training the target speaker separation model 178 on one or more training samples, which may comprise updating the parameters based on gradient-based optimization. For example, the target speaker separation model 178 may be trained with supervised learning based on a plurality of training samples comprising pairs of inputs and outputs, where the input comprises an audio recording containing a voice mixture and the output comprises separated speech from each speaker.

The output from speaker separation model 178 comprises an audio frame where the target speaker's voice has been separated from the voice mixture in the audio frame. Each of the audio frames may be joined to generate target speech 620, which comprises the complete audio recording where the target speaker's voice has been extracted and speech of non-target speakers is suppressed.

Figure 7:
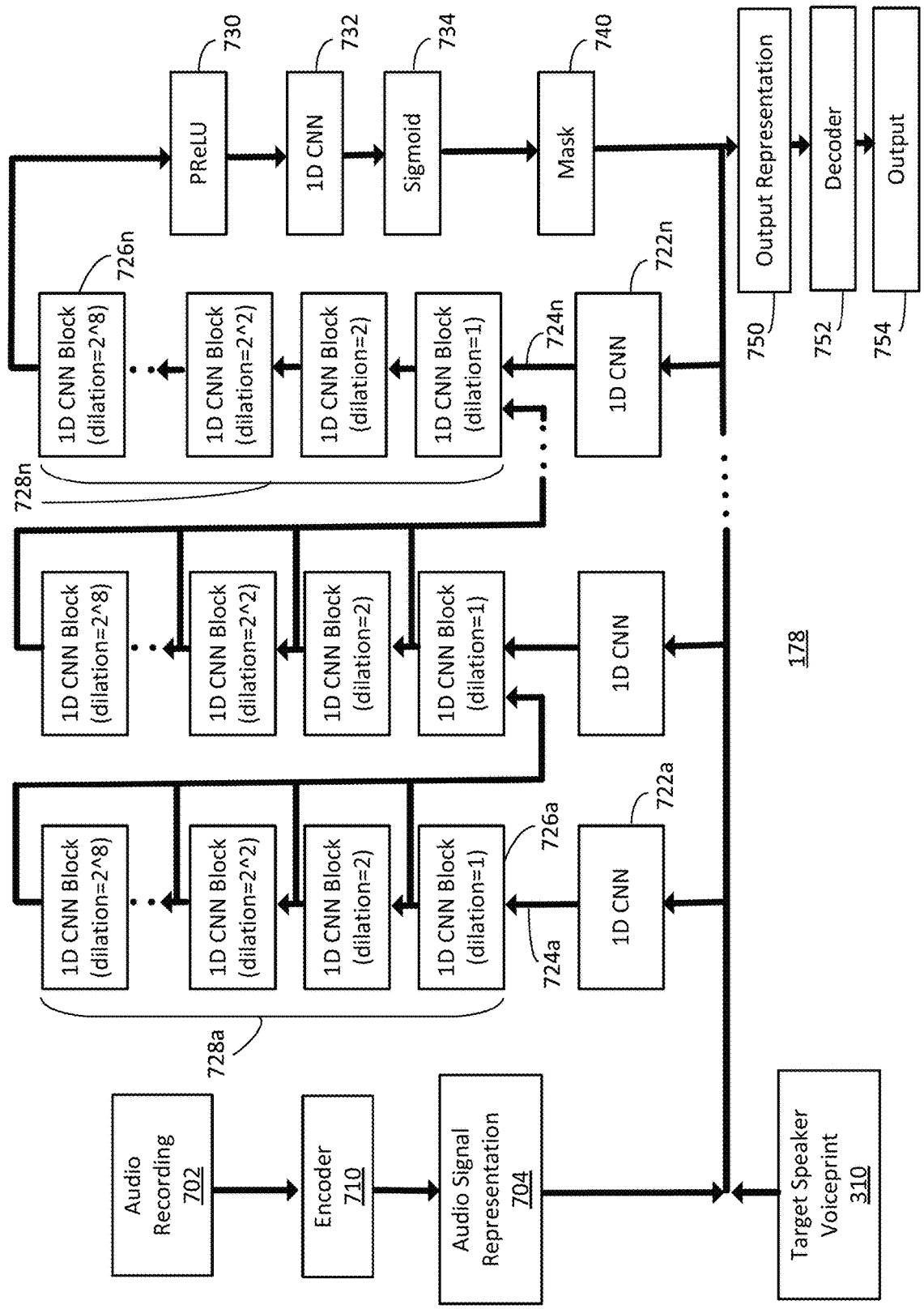
FIG. 7 is a diagram illustrating an exemplary neural network embodiment of target speaker separation model according to one embodiment of the present disclosure.

FIG. 7 is a diagram illustrating an exemplary neural network embodiment of target speaker separation model 178 according to one embodiment of the present disclosure.

In some embodiments, voiceprint extractor 172, target speaker VAD model 174, and target speaker separation model 178 may each comprise neural networks and may share similar neural network structures. In some embodiments, voiceprint extractor 172, target speaker VAD model 174, and target speaker separation model 178 may share one or more neural network weights.

Audio recording 702, such as an audio recording from a video conference, may be received as input to target speaker separation model 178. Audio recording 702 may comprise an audio frame. Audio frame may have been previously processed by multi-speaker detection model 174 to determine that the audio frame contains speech from multiple speakers. Audio recording 702 may be input to encoder 710 to encode the audio recording 702 into an audio signal representation 704, such as a spectrogram, using, for example, Short-time Fourier Transform (STFT), filter banks, or other methods.

Target speaker separation model 178 may comprise a plurality of 1D CNNs 722*a-n* that each receive the audio signal representation 704 and target speaker voiceprint 310 as input and generate input signal embeddings 724*a-n* based on the audio signal representation 704 and/or target speaker voiceprint 310. Each 1D CNN 722*a-n* is followed by a network block 728*a-n* that receives as input the output of the corresponding 1D CNN 722*a-n*.

In an embodiment, target speaker separation model 178 comprises a DNN including one or more network blocks 728*a-n*. Each network block 728*a-n* comprises one or more convolutional blocks 726*a-n*, and each convolutional block comprises one or more neural networks. In an embodiment, each network block 728*a-n* comprises a series of convolutional blocks of increasing dilation, the output of each convolutional block in the series being input to the next convolutional block in the series. The network blocks 728*a-n* may be arranged in a series, and the outputs of one or more convolutional blocks in a network block 728*a-n* are summed and input to a next network block 728*a-n*. In an embodiment, the sum of the outputs of the one or more convolutional blocks in the network block 728*a-n* are fused with an embedding of the input audio signal representation 704 prior to inputting the sum to the next network block. In an embodiment, each convolutional block 726*a-n* comprises one or more CNNs or shuffle CNNs.

The output of the last network block 728*n* is input to Parametric Rectified Linear Unit (PReLU) layer 730 followed by 1D CNN 732 and sigmoid layer 734. Sigmoid layer 734 generates mask 740, which may comprise a spectrogram. Mask 740 may be combined with audio signal representation 704 to generate output representation 750. Output representation 750 may be decoded by decoder 752 to generate output audio recording 754, which may comprise the separated speech from the target speaker.

In an embodiment, voiceprint extractor 172 and target speaker VAD model 176 each comprise a neural network including a network block 728*a-n* and a 1D CNN 722*a-n*. The network block in voiceprint extractor 172 and/or target speaker VAD model 176 may optionally share one or more weights with the target speaker separation model 178, wherein the network block in voiceprint extractor 172 and/or target speaker VAD model 176 has the same neural network weights as one of the network blocks in target speaker separation model 178. For example, one or more neural network weights in the 1D CNN and convolutional blocks may be the same in the target speaker separation model 178 and voiceprint extractor 172 and/or target speaker VAD model 176. In some embodiments, all the neural network weights may be shared and be the same in the target speaker separation model 178 and voiceprint extractor 172 and/or target speaker VAD model 176. In other embodiments, voiceprint extractor 172 and target speaker VAD model 176 may each comprise a network block having the same structure as network blocks 728*a-n* in target speaker separation model 178, but the network blocks comprise different weights.

Figure 8A:
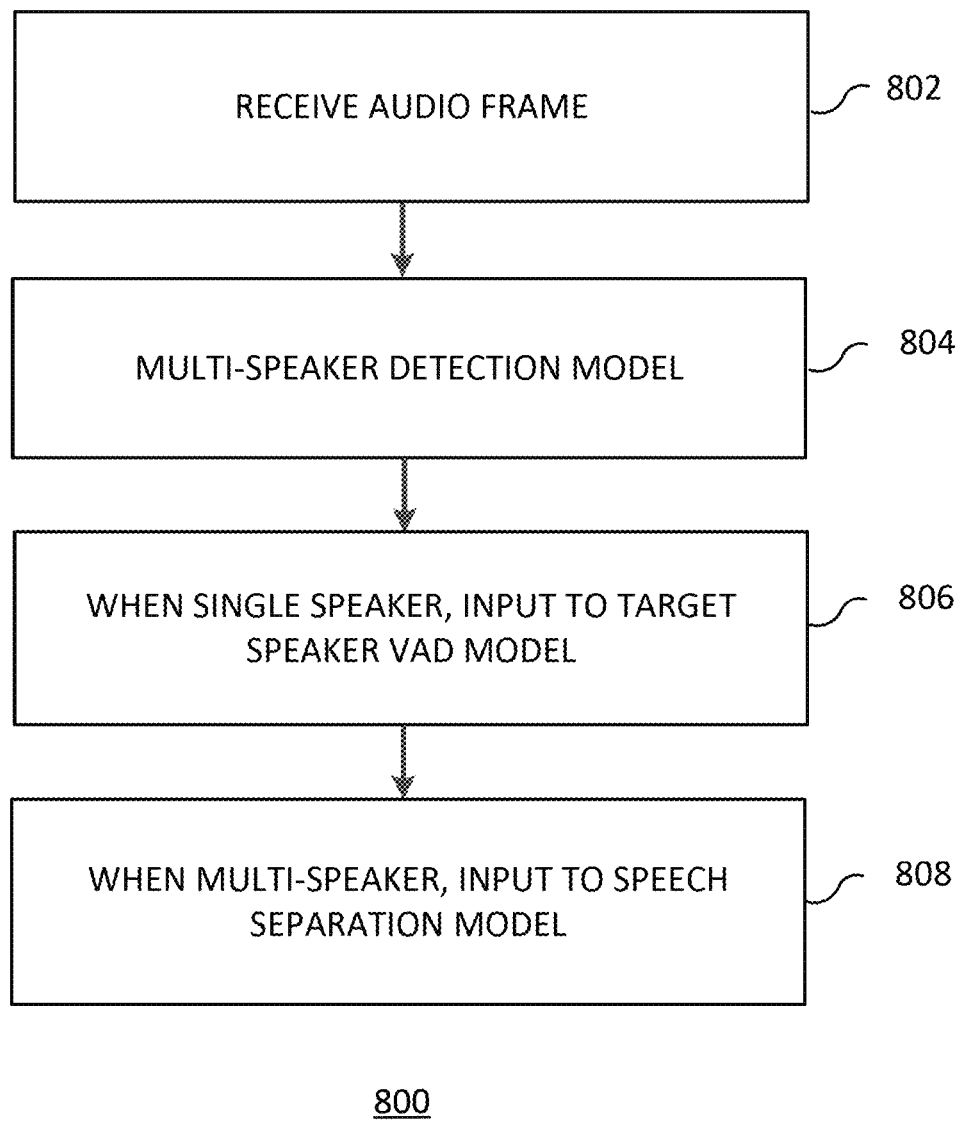
FIG. 8A is a flow chart illustrating an exemplary method that may be performed in some embodiments.

FIG. 8A is a flow chart illustrating an exemplary method 800 that may be performed in some embodiments.

At step 802, a target speaker extraction system receives an audio frame of an audio signal, the target speaker extraction system comprising a multi-speaker detection model 174, a target speaker VAD model 176, and a speech separation model 178. The audio signal may comprise an audio recording during a video conference. In an embodiment, the audio signal is split into a plurality of audio frames by an audio segmenter.

At step 804, the multi-speaker detection model 174 analyzes the audio frame to determine whether the audio frame includes only a single-speaker or multiple speakers. Multi-speaker detection model 174 may analyze the audio frame and based on features of the audio frame, such as the consistency or distribution of characteristics of the speech in the audio frame, areas of silence or breaks in speech, overlapping speech, and other features, determine whether one speaker or multiple speakers are speaking in the audio frame. Output of the multi-speaker detection module 174 may comprise a binary classification of whether one speaker is speaking or multiple speakers are speaking.

At step 806, when the audio frame includes only a single speaker, the audio frame is input to the target speaker VAD model 176 to suppress speech in the audio frame from a non-target speaker based on comparing the audio frame to a voiceprint 310 of a target speaker. In one embodiment, the target speaker VAD suppresses speech in the audio frame from the non-target speaker based on a suppression ratio. In one embodiment, the target speaker VAD model 176 may generate a voiceprint of the non-target speaker, compare the voiceprint of the non-target speaker to the voiceprint of the target speaker to determine a similarity score, and determine the suppression ratio based on the similarity score.

At step 808, when the audio frame includes multiple speakers, the audio frame is input to the speech separation model 178 to separate the voice of the target speaker from a voice mixture in the audio frame. In an embodiment, target speaker separation model 178 performs speech separation on the audio frame to separate the target speaker's voice from the voice mixture in the audio frame. The target speaker separation model 178 may use the target speaker's voiceprint 310 for speech separation and for identifying the target speaker's voice in the voice mixture.

Figure 8B:
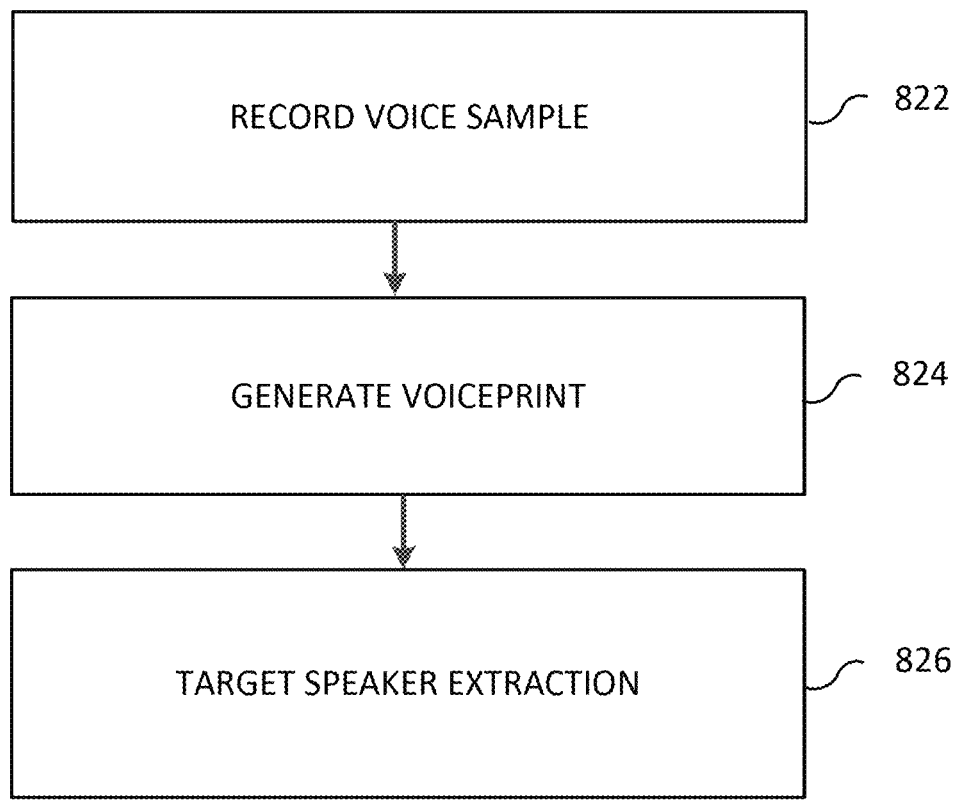
FIG. 8B is a flow chart illustrating an exemplary method that may be performed in some embodiments.

FIG. 8B is a flow chart illustrating an exemplary method 820 that may be performed in some embodiments.

At step 822, a target speaker extraction system prompts a user to record a voice sample during a configuration mode. In an embodiment, the configuration mode occurs after a target speaker mode is enabled or before a video conference. In an embodiment, the target speaker extraction system may display a configuration screen with one or more predefined phrases and prompt the user to say the phrases. Alternatively, the target speaker extraction system may allow the user to say a phrase of his or her choice.

At step 824, a voiceprint extractor 172 generates a voiceprint 310 of a target speaker based on the voice sample. In an embodiment, voiceprint extractor 172 generates the voiceprint 310 based on voice characteristics of the target speaker in the voice sample. Voiceprint 310 may comprise an embedding, such as a vector representation.

At 826, the target speaker extraction system extracts speech of the target speaker from an audio recording during a video conference using the voiceprint 310 of the target speaker. For example, the speech of the target speaker may be extracted using target speaker VAD model 176 or target speaker separation model 178.

Figure 8C:
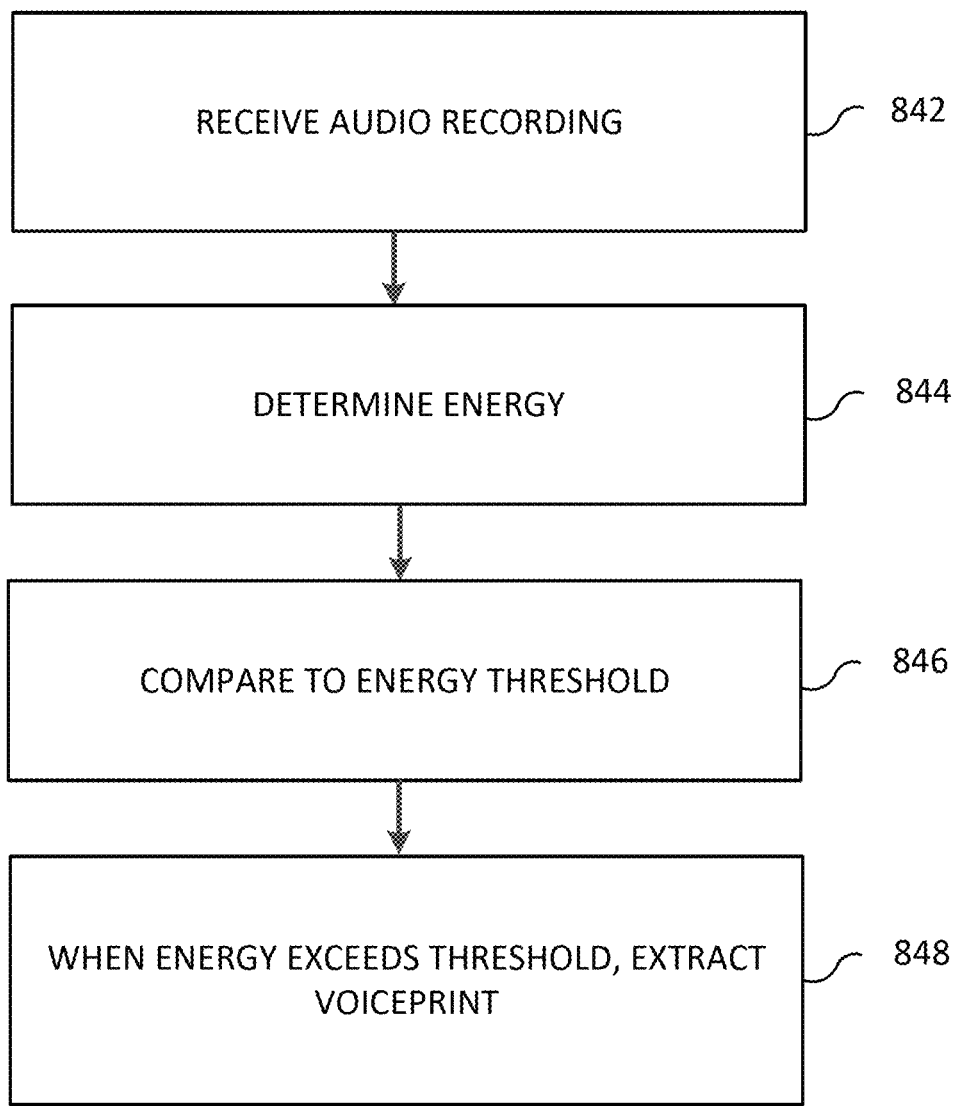
FIG. 8C is a flow chart illustrating an exemplary method that may be performed in some embodiments.

FIG. 8C is a flow chart illustrating an exemplary method 840 that may be performed in some embodiments.

At step 842, a target speaker extraction system receives an audio recording from a user during a video conference.

At step 844, the audio recording is analyzed to determine the energy of the audio recording. Energy detector 532 may be used to determine the energy of the audio recording.

At step 846, the energy of the audio recording is compared to an energy threshold. In an embodiment, the energy threshold may comprise a predefined threshold amount of energy. The energy threshold may be configurable.

At step 848, when the energy of the audio recording exceeds the energy threshold, the audio recording is input to a voiceprint extractor to generate a voiceprint 310 of the target speaker. The voiceprint 310 may be used to extract speech of the target speaker from an audio recording. Method 840 may enable the target speaker extraction system to obtain voiceprint 310 without requiring separately prompting the user to provide a voice sample during a configuration mode.

Figure 8D:
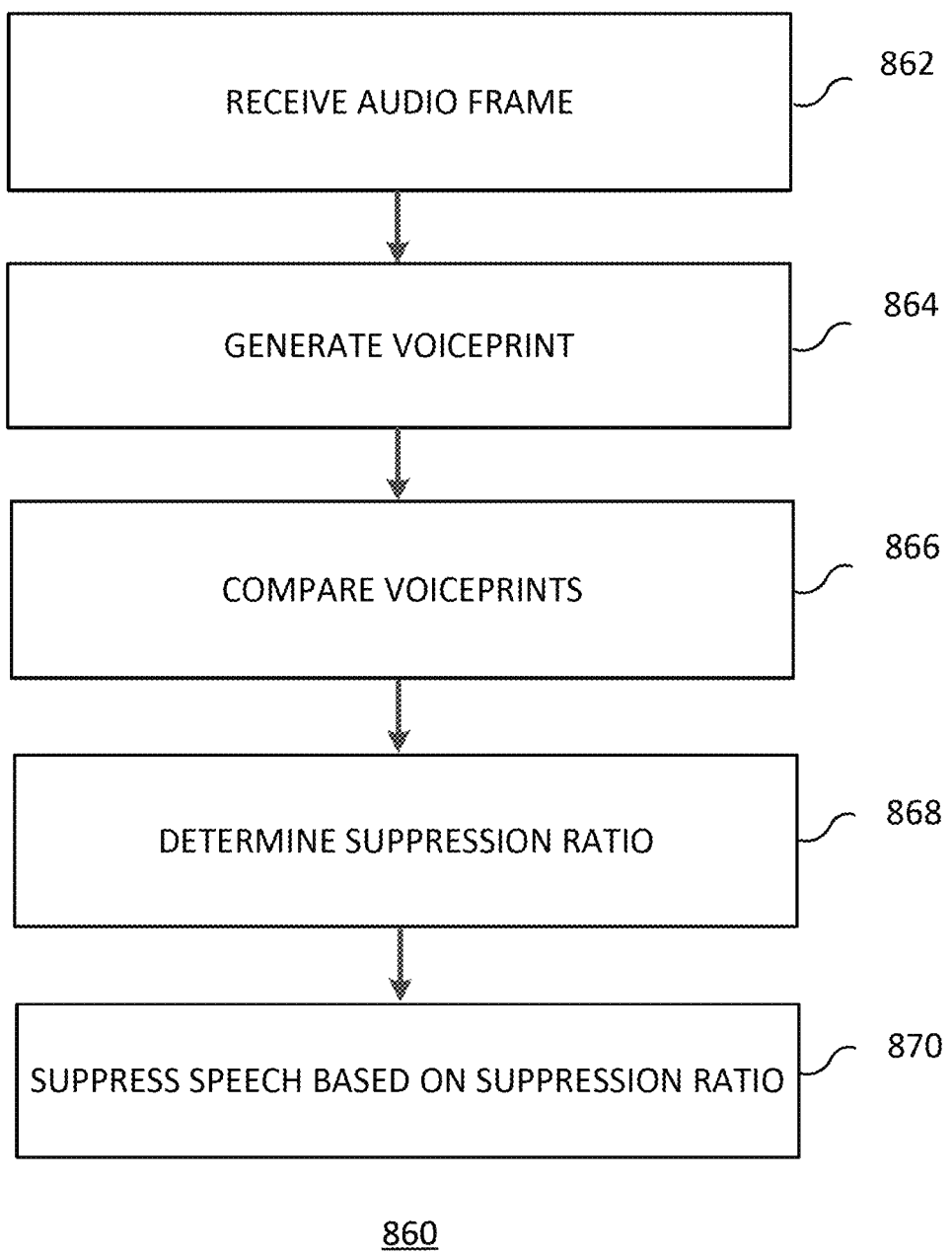
FIG. 8D is a flow chart illustrating an exemplary method that may be performed in some embodiments.

FIG. 8D is a flow chart illustrating an exemplary method 860 that may be performed in some embodiments.

At step 862, a target speaker extraction system receives an audio frame of an audio signal, the target speaker extraction system comprising a target speaker VAD model 176. The audio signal may comprise an audio recording during a video conference. In an embodiment, the audio signal is split into a plurality of audio frames by an audio segmenter. In one embodiment, a multi-speaker detection model 174 analyzes the audio frame and determines that it contains a single speaker before the audio frame is input to the target speaker VAD model 176.

At step 864, a voiceprint extractor 172 generates a voiceprint of the audio frame. In an embodiment, voiceprint extractor 172 generates the voiceprint of the audio frame based on voice characteristics of the speaker in the audio frame. The voiceprint may comprise an embedding, such as a vector representation.

At step 866, a similarity model 534 compares the voiceprint of the audio frame to a voiceprint 310 of a target speaker to determine a similarity score. In one embodiment, similarity model 534 computes the cosine similarity between the voiceprint of the audio frame and target speaker voiceprint 310, where both the voiceprints comprise vectors. In some embodiments, similarity model 534 may comprise a ML model, such as a neural network, CNN, or DNN.

At step 868, a suppression ratio is determined based on the similarity score. In an embodiment, target speaker VAD model 176 selects a higher suppression ratio when the similarity score is lower and a lower suppression ratio when the similarity score is higher in order to reduce suppression of voices that are similar to the target speaker's voice.

At step 870, speech in the audio frame is suppressed based on the suppression ratio. In one embodiment, magnitude values of speech in the audio frame are multiplied by the suppression ratio to reduce the magnitude of the speech in the audio frame.

III. Exemplary Lip Movement-Based System

Figure 9:
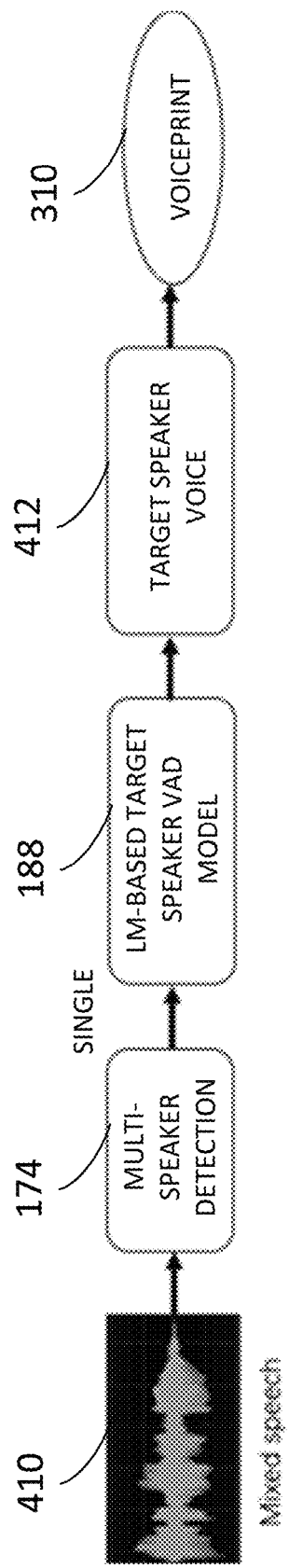
FIG. 9 is a diagram illustrating an exemplary LM-based target speaker VAD model according to one embodiment of the present disclosure.

FIG. 9 is a diagram illustrating an exemplary LM-based target speaker VAD model 188 according to one embodiment of the present disclosure.

In an embodiment, LM-based target speaker VAD model 188 may be used to extract the target speaker's voiceprint during a video conference without needing to separately record a user's voice sample and extract the voiceprint during a configuration mode. This process may enable a user to use target speaker mode without having to perform a separate configuration process to record his or her voice. Audio recording 410 is received and may comprise an audio recording of a user during a video conference. Multi-speaker detection model 174 processes the audio recording 410 to determine whether one speaker or multiple speakers are speaking in the audio recording, as described elsewhere herein. When multi-speaker detection model 174 determines that one speaker is speaking in the audio recording 410, then the audio recording 410 is input to LM-based target speaker VAD model 188. In one embodiment, the audio recording 410 may comprise one or more audio frames.

LM-based target speaker VAD model 188 may receive the audio recording 410 and an associated video captured of the user by a camera during the recording of the audio. For example, the video may comprise video of the user in the video conference. LM-based target speaker VAD model 188 analyzes the video to determine whether the user's lips are moving. When LM-based target speaker VAD model 188 determines that the user's lips are moving, then LM-based target speaker VAD model 188 may determine that the target speaker is speaking. In one embodiment, the LM-based target speaker VAD model 188 processes a plurality of audio frames with associated video or still images and determines for each audio frame whether the target speaker is speaking based on whether the user's lips are moving. The LM-based target speaker VAD model 188 may suppress speech in audio frames where the user's lips are not moving and keep speech in audio frames where the user's lips are moving. The audio frames may be joined together to generate audio recording 412 of the target speaker's voice. The LM-based target speaker VAD model 188 may generate the target speaker's voiceprint 310 from the audio recording 412 of the target speaker's voice.

In one embodiment, LM-based target speaker VAD model 188 detects whether the user's lips are moving based on facial key points. A facial key point detector may analyze a video or image of a user's face to detect one or more key points on a user's face that correspond to landmarks, such as the tip of the noise, the inner and outer edge of the eyes, and so on. In some embodiments, facial key point detector may comprise a ML model, such as a neural network, CNN, or DNN. For example, facial key point detector may comprise a CNN with one or more feature detectors corresponding to facial landmarks.

Facial key point detector may detect a plurality of key points on the edge of the user's top lip and bottom lip. In one embodiment, facial key point detector detects five key points on the edge of user's top lip and five key points on the edge of user's bottom lip. The top lip and bottom key points may comprise a plurality of pairs of key points that are horizontally aligned so that each top lip key point has a bottom key point directly below it. Facial key point detector may measure the distance between the corresponding top lip key points and bottom lip key points. The distance may be measured in pixels or may be converted to real-world units.

In one embodiment, the distance between the top lip key points and corresponding bottom lip key points is tracked between video frames and, when there is a change in distance between the top lip key points and corresponding bottom lip key points, the system determines that the target speaker is speaking. Facial key point detector may track one or more lip key points across a sequence of video frames. Facial key point detector may associate the lip key points in each video frame with the corresponding lip key point in subsequent video frames in the sequence. Facial key point detector may detect the distance between each pair of top lip key point and bottom lip key point and determine how the distance changes between sequential video frames. When the change in distance is zero, then the relative distance between corresponding top lip key points and bottom lip key points has not changed. In this case, the facial key point detector may determine that the target speaker is not speaking. When the absolute value of the change in distance (positive or negative change) is greater than zero, then the relative distance between corresponding top lip key points and bottom lip key points has changed. In this case, the facial key point detector may determine that the target speaker is speaking. Alternatively, when the absolute value of the change in distance is below a distance threshold, then the facial key point detector determines that the target speaker is not speaking. When the absolute value of the change in distance is greater than the distance threshold, then the facial key point detector determines that the user's mouth is open and that the target speaker is speaking. Facial key point detector may measure the change in distance between each of the pairs of top lip key points and bottom lip key points or only some of the pairs. In some embodiments, the facial key point detector may compute the average change in distance between the pairs of top lip key points and bottom lip key points or a sum of the change in distances between the pairs of top lip key points and bottom lip key points and compare these values either to zero or to a threshold.

Alternatively, facial key point detector may detect when lip key points move between video frames, and, when the lip key points move, determine that the target speaker is speaking. Facial key point detector may track one or more lip key points across a sequence of video frames. Facial key point detector may associate the lip key points in each video frame with the corresponding lip key point in subsequent video frames in the sequence. Facial key point detector may determine whether each lip key point changed location between the sequential frames. When the lip key points have moved, then the facial key point detector may determine that the target speaker is speaking. When the lip key points have not moved, then the facial key point detector may determine that the target speaker is not speaking. In some embodiments, facial key point detector may compare the amount of movement of the lip key points to a distance threshold. When the lip key points have moved more than a distance threshold, then the facial key point detector may determine that the target speaker is speaking. When the lip key points have moved less than the distance threshold, then the facial key point detector may determine that the target speaker is not speaking. Facial key point detector may measure the amount of movement of each lip key point or only some of the lip key points. In some embodiments, the facial key point detector may compute the amount of movement of each lip key point or a sum of the movement of the lip key points and compare these values either to zero or to a threshold.

In a further variation, facial key point detector may comprise a ML model that is trained to analyze video or still images of a user and detect when the user in the video is speaking. When the ML model determines that the user in the video is speaking, then it outputs a result that the target speaker is speaking. Facial key point detector may include one or more parameters, such as internal weights of a neural network, that may determine the operation of the facial key point detector. The parameters of facial key point detector may be learned through training the facial key point detector on one or more training samples, which may comprise updating the parameters based on gradient-based optimization. For example, the multi-speaker detection model 174 may be trained with supervised learning based on a first plurality of training samples comprising videos where the user is speaking and a second plurality of training samples comprising videos where the user is not speaking.

Figure 10:
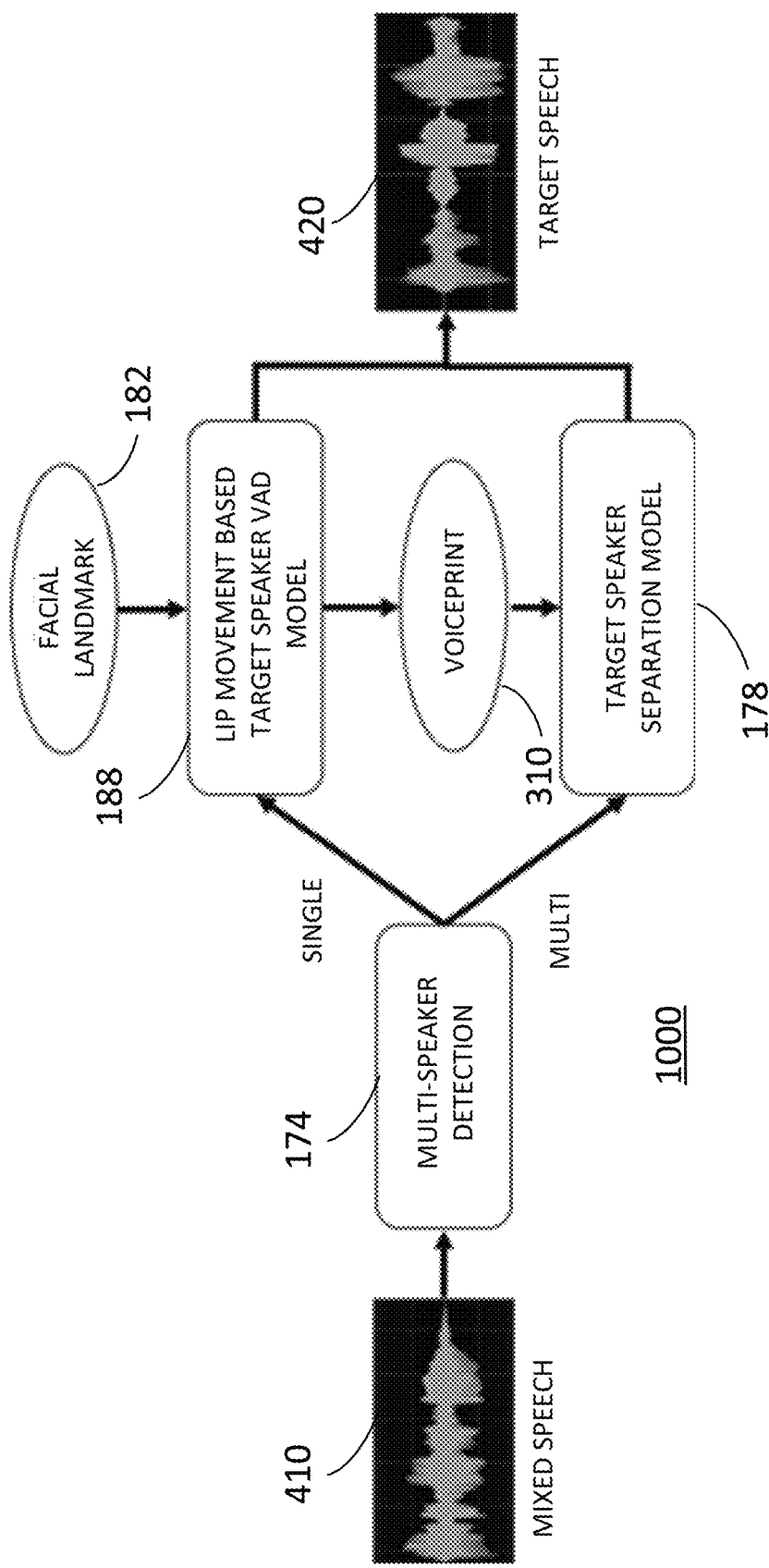
FIG. 10 is a diagram illustrating an exemplary LM-based target speaker extraction system according to one embodiment of the present disclosure.

FIG. 10 is a diagram illustrating an exemplary LM-based target speaker extraction system 1000 according to one embodiment of the present disclosure.

In an embodiment, LM-based target speaker extraction system 1000 may share some or all of the components of target speaker extraction system 400, except that LM-based target speaker VAD model 188 may be used instead of target speaker VAD model 176.

As described in target speaker extraction system 400, an audio recording 410 may be received and may be divided into audio frames by an audio segmenter. As described elsewhere herein, each audio frame may be analyzed by a VAD model that detects whether any speech is present in the audio frame to determine when processing needs to continue. The target speaker extraction system 1000 may include multi-speaker detection model 174, target speaker separation model 178, voiceprint 310, and target speech 420 as described elsewhere herein. Multi-speaker detection model 174 processes each audio frame to determine whether one speaker or multiple speakers are speaking in the audio frame.

When multi-speaker detection model 174 determines that one speaker is speaking in the audio frame, then the audio frame is input to LM-based target speaker VAD model 188. As described with respect to FIG. 9 and elsewhere herein, LM-based target speaker VAD model 188 may use facial landmarks 182 to determine whether the audio frame contains the target speaker's voice or not by analyzing video associated with the audio frame to determine whether the user's lips are moving. Facial landmarks 182 may comprise one or more key points identifying landmarks of a user's face in a video. When the audio frame contains the target speaker's voice then it is kept intact, but when the audio frame contains a non-target speaker's voice then speech in the audio frame is suppressed.

In one embodiment, LM-based target speaker VAD model 188 performs a binary classification and determines whether the audio frame includes speech from the target speaker or a non-target speaker. When LM-based target speaker VAD model 188 determines that the audio frame includes speech from the target speaker, it does not change the audio frame. When LM-based target speaker VAD model 188 determines that the audio frame includes speech from a non-target speaker, then a post-processing module 512 may reduce the magnitude of the speech in the audio frame to zero so that the speech is completely suppressed. Alternatively, LM-based target speaker VAD model 188 may determine a likelihood that the user is speaking based on lip movement in the video, where the likelihood may comprise a probability value between 0 and 1. LM-based target speaker VAD model 188 may determine a suppression ratio based on the likelihood, which determines how much the speech in the audio frame will be suppressed. For example, the suppression ratio may be equal to the probability that the user is speaking. Post-processing module 512 may reduce the magnitude of the speech in the audio frame by the suppression ratio to suppress the speech, as described elsewhere herein.

When multi-speaker detection model 174 determines that multiple speakers are speaking in the audio frame, then the audio frame is input to target speaker separation model 178 to separate the target speaker's speech from the voice mixture in the audio frame, as described elsewhere herein. The target speaker extraction system 1000 may check that target speaker voiceprint 310 is provided, and, if target speaker voiceprint 310 is not provided, then target speaker separation model 178 may be disabled until voiceprint 310 is available.

The output from LM-based target speaker VAD model 188 and target speaker separation model 178 comprises an audio frame where the target speaker's voice has been extracted by reducing or removing speech from non-target speakers. Each of the audio frames may be joined to generate target speech 420, which comprises the complete audio recording where the target speaker's voice has been extracted and speech of non-target speakers is suppressed. When the audio frames have been encoded into an audio signal representation, then the audio frames may be decoded after target speaker extraction, by a decoder, into playable audio.

In addition, when LM-based target speaker VAD model 188 determines that the target speaker is speaking based on lip movement of a user in a video, the recorded audio may be used to generate target speaker voiceprint 310. The target speaker voiceprint 310 may be used for target speaker separation by target speaker separation model 178.

In some embodiments, target speaker extraction system 1000 may perform processing to handle video where multiple users are present. In an embodiment, LM-based target speaker VAD model 188 detects whether one face or more than one face is present in a video. When more than one face is in a video, then LM-based target speaker VAD model 188 may transmit a signal to target speaker extraction system 1000 to disable lip movement-based target speaker extraction. In an embodiment, the target speaker mode may be disabled when multiple faces are detected in the video. In some embodiments, target speaker extraction may be performed using voiceprint-based extraction only, such as in target speaker extraction system 400, when multiple faces are detected in the video. LM-based target speaker VAD model 188 may continue to monitor video from the user, and when the multiple faces leave the video so that only one face remains, then the target speaker mode may be resumed.

In other embodiments, LM-based target speaker VAD model 188 may analyze the lips of each face in the video and detect when any of the lips are moving. When the lips of any user in the video is moving, then LM-based target speaker VAD model 188 may determine that a target speaker is speaking. In this mode, LM-based target speaker VAD model 188 may keep the speech of any user who appears in the video and suppress the speech of users who are not in the video.

In an embodiment, target speaker extraction system 1000 may detect prior to processing whether the camera of a user is enabled or disabled. When the camera is disabled, then video may not be received. When there is no video, target speaker extraction system 1000 may disable lip movement-based target speaker extraction and may use voiceprint based target speaker extraction instead as described with respect to FIG. 4 and elsewhere herein.

Figure 11:
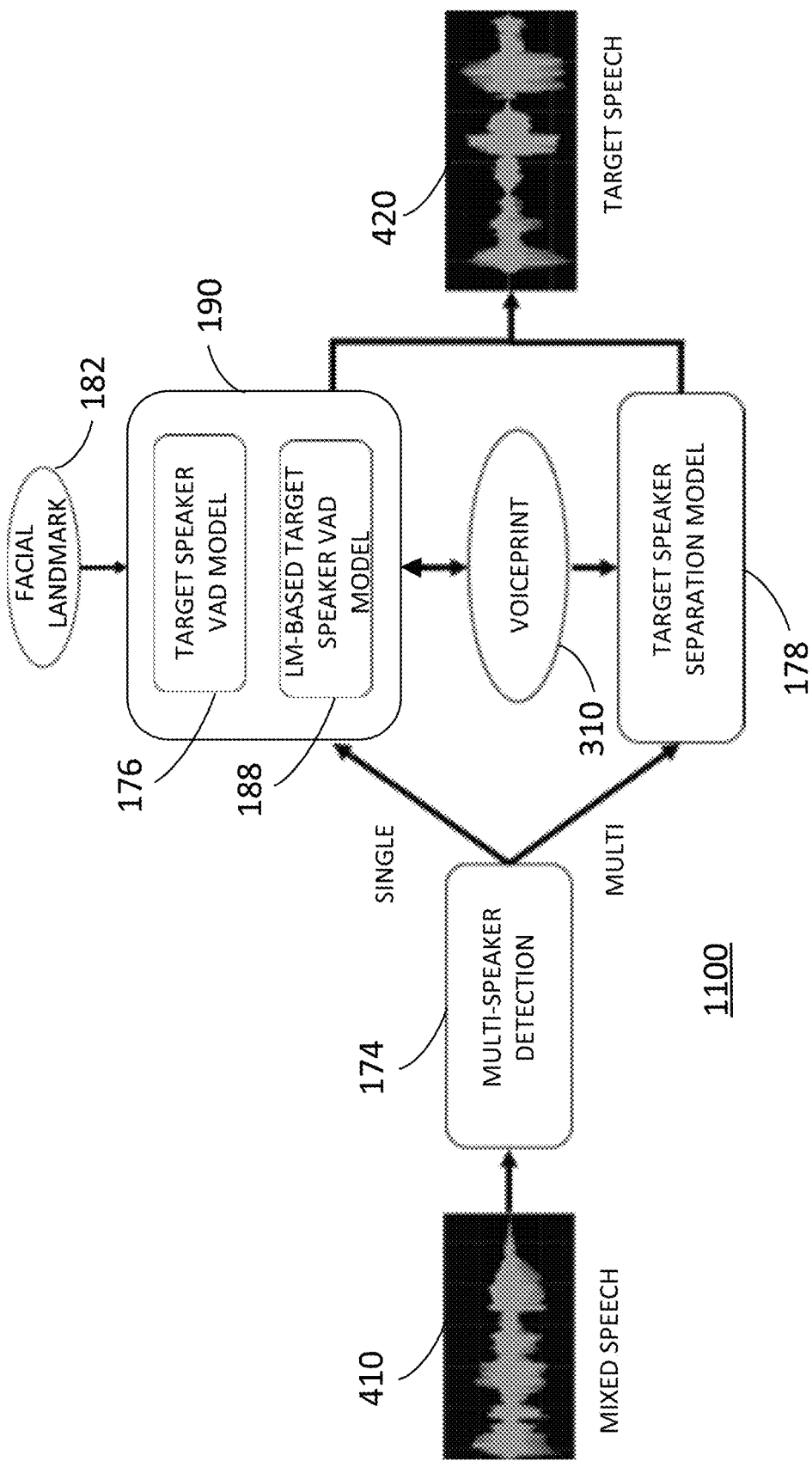
FIG. 11 is a diagram illustrating an exemplary target speaker extraction system using both voiceprint-based target speaker extraction and LM-based target speaker extraction according to one embodiment of the present disclosure.

FIG. 11 is a diagram illustrating an exemplary target speaker extraction system 1100 using both voiceprint-based target speaker extraction and LM-based target speaker extraction according to one embodiment of the present disclosure.

In an embodiment, target speaker extraction system 1100 may share some or all of the components of target speaker extraction system 400 and LM-based target speaker extraction system 1000, except that LM-based target speaker VAD model 188 and target speaker VAD model 176 are used in a combined target speaker VAD model 190. The target speaker extraction system 1100 may include audio segmenter, VAD model, multi-speaker detection model 174, target speaker separation model 178, voiceprint 310, facial landmarks 182, and target speech 420 as described elsewhere herein.

When multi-speaker detection model 174 determines that one speaker is speaking in the audio frame, then the audio frame is input to combined target speaker VAD model 190. In combined target speaker VAD model 190, both the target speaker VAD model 176 and LM-based target speaker VAD model 188 may process the audio frame and the output of both models is combined by combined target speaker VAD model 190 to output a combined result. Target speaker VAD model 176 may compare the audio frame to target speaker's voiceprint 310 to determine whether the audio frame contains the target speaker's voice or not. LM-based target speaker VAD model 188 may analyze a video recording associated with the audio frame to determine whether the user's lips are moving. In one embodiment, if either target speaker VAD model 176 or LM-based target speaker VAD model 188 outputs a result that the target speaker is speaking, then the combined target speaker VAD model 190 outputs a result that the target speaker is speaking. In one embodiment, if both target speaker VAD model 176 and LM-based target speaker VAD model 188 output a result that the target speaker is speaking, then the combined target speaker VAD model 190 outputs a result that the target speaker is speaking.

In an embodiment, combined target speaker VAD model 190 may comprise a ML model that analyzes and processes the outputs of the target speaker VAD model 176 and LM-based target speaker VAD model 188 to determine whether the target speaker is speaking. Combined target speaker VAD model 190 may comprise one or more neural networks, CNNs, DNNs, or other ML models. Combined target speaker VAD model 190 may include one or more parameters, such as internal weights of a neural network, that may determine the operation of combined target speaker VAD model 190. The parameters of combined target speaker VAD model 190 may be learned through training the combined target speaker VAD model 190 on one or more training samples, which may comprise updating the parameters based on gradient-based optimization. For example, the combined target speaker VAD model 190 may be trained with supervised learning based on a first plurality of training samples where the target speaker is speaking and a second plurality of training samples where a non-target speaker is speaking. Based on the ML model, combined target speaker VAD model 190 outputs a prediction of whether target speaker is speaking.

Figure 12A:
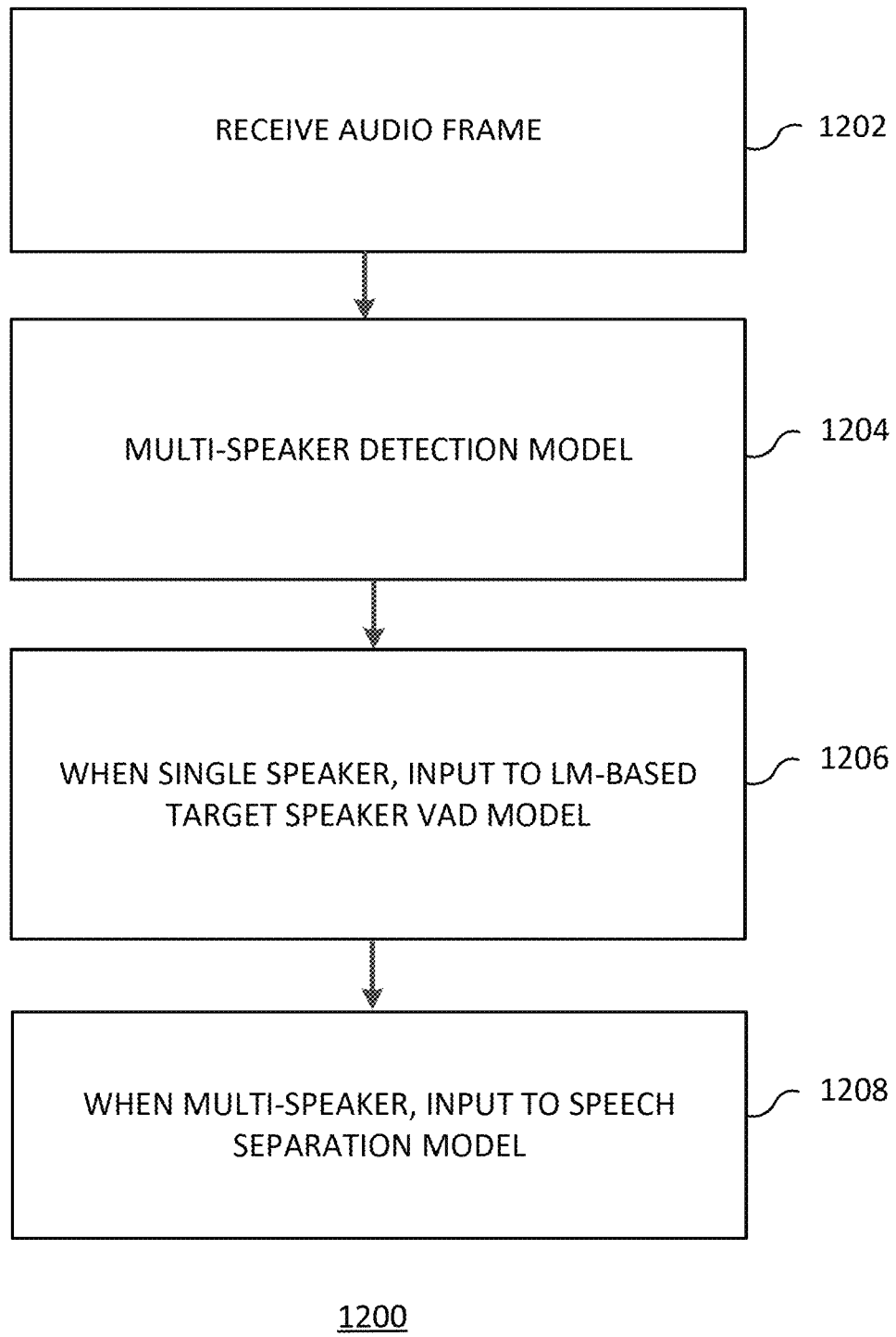
FIG. 12A is a flow chart illustrating an exemplary method that may be performed in some embodiments.

FIG. 12A is a flow chart illustrating an exemplary method 1200 that may be performed in some embodiments.

At step 1202, a target speaker extraction system receives an audio frame of an audio signal, the target speaker extraction system comprising a multi-speaker detection model 174, a LM-based target speaker VAD model 188, and a speech separation model 178. The audio signal may comprise an audio recording during a video conference. In an embodiment, the audio signal is split into a plurality of audio frames by an audio segmenter.

At step 1204, the multi-speaker detection model 174 analyzes the audio frame to determine whether the audio frame includes only a single-speaker or multiple speakers. Multi-speaker detection model 174 may analyze the audio frame and based on features of the audio frame, such as the consistency or distribution of characteristics of the speech in the audio frame, areas of silence or breaks in speech, overlapping speech, and other features, determine whether one speaker or multiple speakers are speaking in the audio frame. Output of the multi-speaker detection module 174 may comprise a binary classification of whether one speaker is speaking or multiple speakers are speaking.

At step 1206, when the audio frame includes only a single speaker, the audio frame is input to the LM-based target speaker VAD model 188 to suppress speech in the audio frame from a non-target speaker based on analyzing a video associated with the audio frame to detect lip movement of a user. In an embodiment, the audio frame may also be input to a target speaker VAD model 176 to suppress speech in the audio frame from a non-target speaker based on comparing the audio frame to a voiceprint of a target speaker. The output of both LM-based target speaker VAD model 188 and target speaker VAD model 176 may be input to a combined target speaker VAD model 190 that may generate a combined output prediction of whether the audio frame includes speech from the target speaker or a non-target speaker and may suppress speech of a non-target speaker.

At step 1208, when the audio frame includes multiple speakers, the audio frame is input to the speech separation model 178 to separate the voice of the target speaker from a voice mixture in the audio frame. In an embodiment, target speaker separation model 178 performs speech separation on the audio frame to separate the target speaker's voice from the voice mixture in the audio frame. The target speaker separation model 178 may use the target speaker's voiceprint 310 for speech separation and for identifying the target speaker's voice in the voice mixture.

Figure 12B:
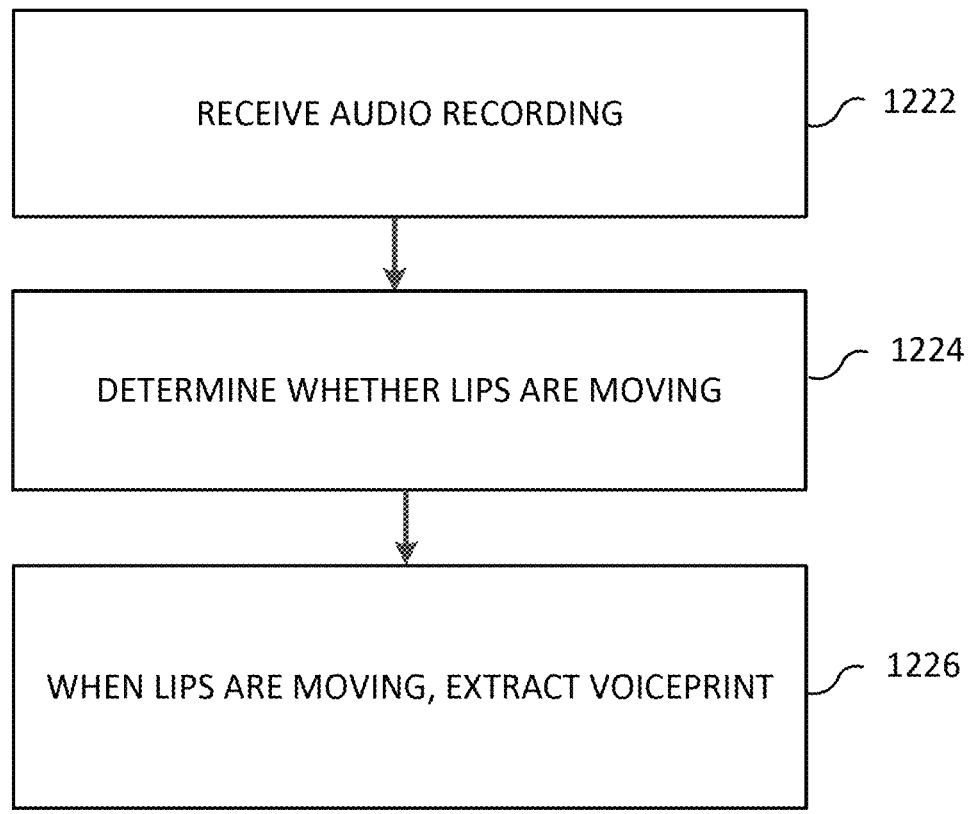
FIG. 12B is a flow chart illustrating an exemplary method that may be performed in some embodiments.

FIG. 12B is a flow chart illustrating an exemplary method 1220 that may be performed in some embodiments.

At step 1222, a target speaker extraction system receives an audio recording and associated video recording from a user during a video conference.

At step 1224, the video recording is analyzed to determine whether the lips of the user are moving. In an embodiment, a plurality of top lip key points and bottom lip key points of a user are detected and the distance between the top lip key points and bottom lip key points are measured. When the distance is below a distance threshold, it is determined that the lips of the user are moving.

At step 1226, when the lips of the user are moving, the audio recording is input to a voiceprint extractor to generate a voiceprint 310 of the target speaker. The voiceprint 310 may be used to extract speech of the target speaker from an audio recording. Method 1220 may enable the target speaker extraction system to obtain voiceprint 310 without requiring separately prompting the user to provide a voice sample during a configuration mode.

Figure 12C:
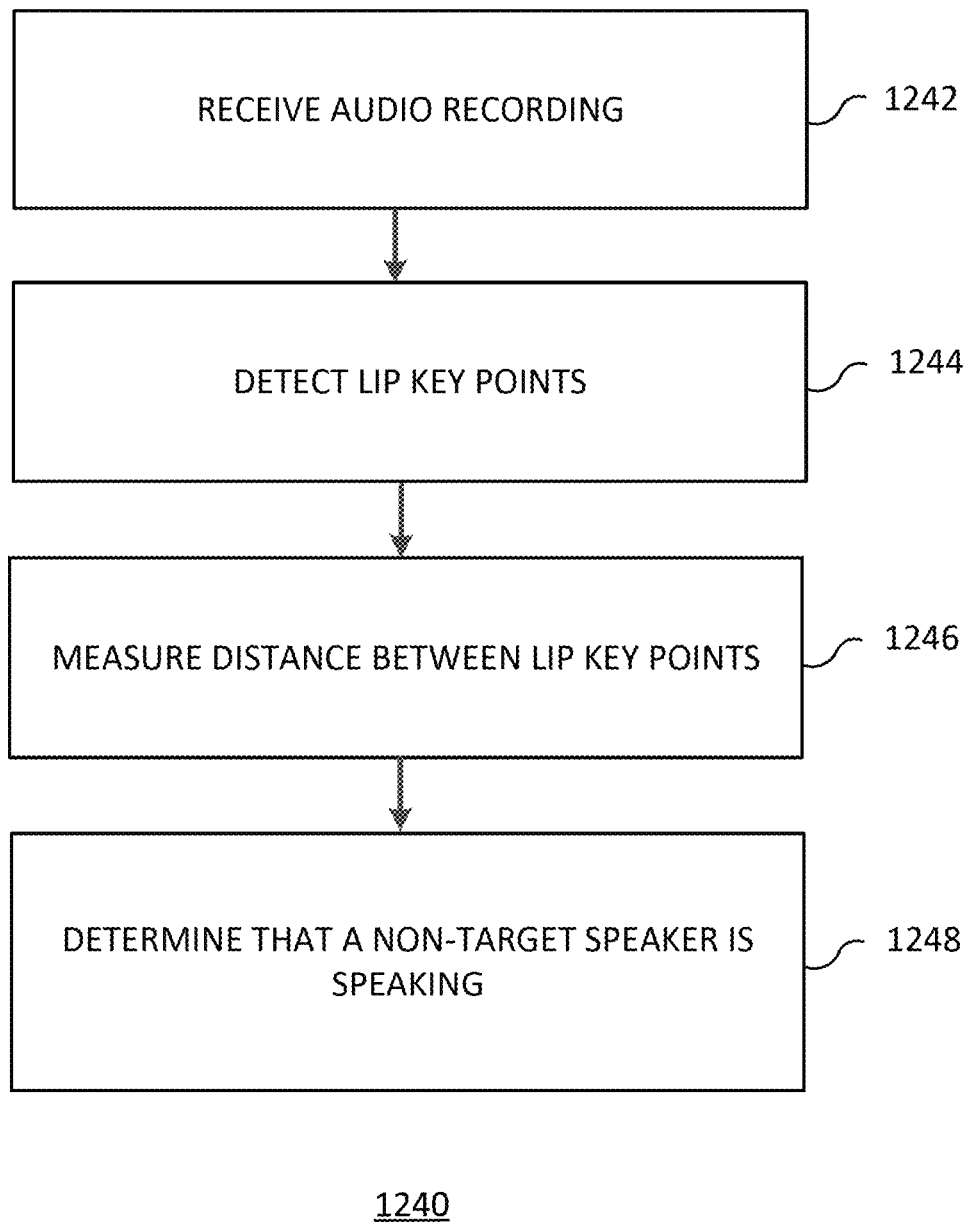
FIG. 12C is a flow chart illustrating an exemplary method that may be performed in some embodiments.

FIG. 12C is a flow chart illustrating an exemplary method 1240 that may be performed in some embodiments.

At step 1242, a target speaker extraction system receives an audio recording and associated video recording from a user during a video conference, the target speaker extraction system comprising a LM-based target speaker VAD model 188. In one embodiment, a multi-speaker detection model 174 analyzes the audio recording and determines that it contains a single speaker before the audio recording and video recording are input to the LM-based target speaker VAD model 188.

At step 1244, a facial key point detector analyzes the video recording to detect a plurality of top lip key point and bottom lip key point pairs. In an embodiment, the facial key point detector comprises a CNN with one or more feature detectors corresponding to the top lip key points and bottom lip key points.

At step 1246, the distance between the top lip key points and corresponding bottom key points may be measured. The distance may be measured in pixels or may be converted to real-world units.

At step 1248, when the distance between the top lip key points and bottom lip key points is below a distance threshold, it is determined that a non-target speaker is speaking and speech of the non-target speaker is suppressed in the audio recording. In an embodiment, the distance threshold may be configurable. In some embodiments, the distance threshold is learned through machine learning. In one embodiment, the speech of the non-target speaker is suppressed based on a suppression ratio.

Exemplary Computer System

Figure 13:
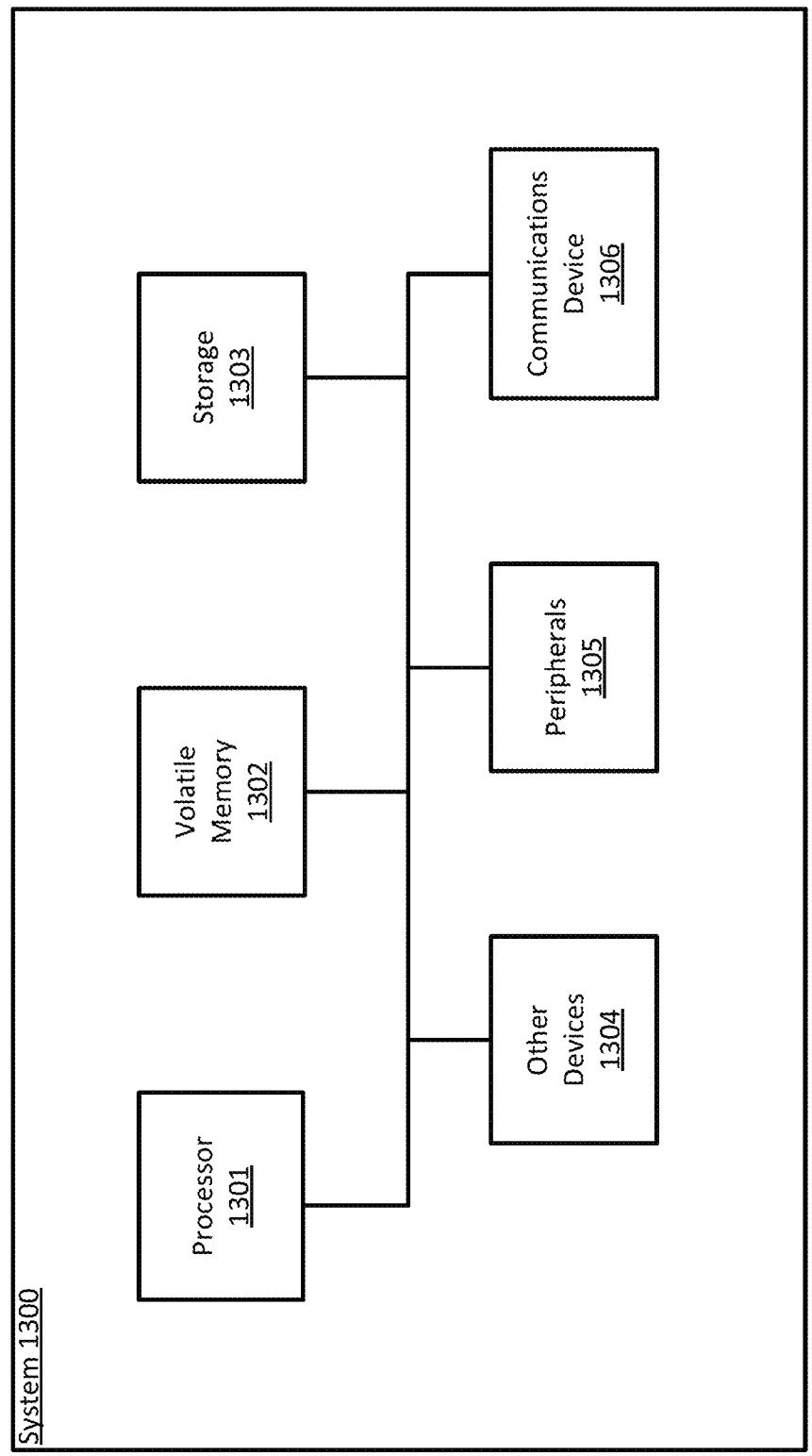
FIG. 13 is a diagram illustrating an exemplary computer that may perform processing in some embodiments.

FIG. 13 is a diagram illustrating an exemplary computer that may perform processing in some embodiments. Exemplary computer 1300 may perform operations consistent with some embodiments. The architecture of computer 1300 is exemplary. Computers can be implemented in a variety of other ways. A wide variety of computers can be used in accordance with the embodiments herein.

Processor 1301 may perform computing functions such as running computer programs. The volatile memory 1302 may provide temporary storage of data for the processor 1301. RAM is one kind of volatile memory. Volatile memory typically requires power to maintain its stored information. Storage 1303 provides computer storage for data, instructions, and/or arbitrary information. Non-volatile memory, which can preserve data even when not powered and including disks and flash memory, is an example of storage. Storage 1303 may be organized as a file system, database, or in other ways. Data, instructions, and information may be loaded from storage 1303 into volatile memory 1302 for processing by the processor 1301.

The computer 1300 may include peripherals 1305. Peripherals 1305 may include input peripherals such as a keyboard, mouse, trackball, video camera, microphone, and other input devices. Peripherals 1305 may also include output devices such as a display. Peripherals 1305 may include removable media devices such as CD-R and DVD-R recorders/players. Communications device 1306 may connect the computer 1300 to an external medium. For example, communications device 1306 may take the form of a network adapter that provides communications to a network. A computer 1300 may also include a variety of other devices 1304. The various components of the computer 1300 may be connected by a connection medium such as a bus, crossbar, or network.

It will be appreciated that the present disclosure may include any one and up to all of the following examples.

Example 1: A computer-implemented method for target speaker extraction, comprising: receiving, by a target speaker extraction system, an audio frame of an audio signal, the target speaker extraction system comprising a multi-speaker detection model, a target speaker VAD model, and a speech separation model; analyzing, by the multi-speaker detection model, the audio frame to determine whether the audio frame includes only a single-speaker or multiple speakers; when the audio frame includes only a single-speaker, inputting the audio frame to the target speaker VAD model to suppress speech in the audio frame from a non-target speaker based on comparing the audio frame to a voiceprint of a target speaker; and when the audio frame includes multiple speakers, inputting the audio frame to the speech separation model to separate the voice of the target speaker from a voice mixture in the audio frame.

Example 2: The method of Example 1, further comprising: suppressing speech in the audio frame from the non-target speaker, by the target speaker VAD, based on a suppression ratio.

Example 3: The method of any Example 1-2, further comprising: generating a voiceprint of the non-target speaker; comparing the voiceprint of the non-target speaker to the voiceprint of the target speaker to determine a similarity score; and determining the suppression ratio based on the similarity score.

Example 4: The method of any Example 1-3, further comprising: receiving a voice recording from a target speaker prior to a video conference; generating the voiceprint of the target speaker from the voice recording prior to the video conference; and using the target speaker extraction system and the voiceprint of the target speaker to extract the voice of the target speaker during the video conference.

Example 5: The method of any Example 1-4, further comprising: analyzing the audio signal to determine the energy of the audio signal, wherein the audio signal is received during a video conference; and determining, based on the energy, that the target speaker is speaking and generating the voiceprint of the target speaker from the audio signal.

Example 6: The method of any Example 1-5, wherein determining, based on the energy, that the target speaker is speaking comprises determining that the energy exceeds a threshold.

Example 7: The method of any Example 1-6, further comprising: generating, by a voiceprint extraction model, the voiceprint of the target speaker, wherein the voiceprint extraction model shares one or more weights with the speech separation model.

Example 8: A non-transitory computer readable medium that stores executable program instructions that when executed by one or more computing devices configure the one or more computing devices to perform operations comprising: receiving, by a target speaker extraction system, an audio frame of an audio signal, the target speaker extraction system comprising a multi-speaker detection model, a target speaker VAD model, and a speech separation model; analyzing, by the multi-speaker detection model, the audio frame to determine whether the audio frame includes only a single-speaker or multiple speakers; when the audio frame includes only a single-speaker, inputting the audio frame to the target speaker VAD model to suppress speech in the audio frame from a non-target speaker based on comparing the audio frame to a voiceprint of a target speaker; and when the audio frame includes multiple speakers, inputting the audio frame to the speech separation model to separate the voice of the target speaker from a voice mixture in the audio frame.

Example 9: The non-transitory computer readable medium of Example 8, the operations further comprising: suppressing speech in the audio frame from the non-target speaker, by the target speaker VAD, based on a suppression ratio.

Example 10: The non-transitory computer readable medium of any Example 8-9, the operations further comprising: generating a voiceprint of the non-target speaker; comparing the voiceprint of the non-target speaker to the voiceprint of the target speaker to determine a similarity score; and determining the suppression ratio based on the similarity score.

Example 11. The non-transitory computer readable medium of any Example 8-10, the operations further comprising: receiving a voice recording from a target speaker prior to a video conference; generating the voiceprint of the target speaker from the voice recording prior to the video conference; and using the target speaker extraction system and the voiceprint of the target speaker to extract the voice of the target speaker during the video conference.

Example 12: The non-transitory computer readable medium of any Example 8-11, the operations further comprising: analyzing the audio signal to determine the energy of the audio signal, wherein the audio signal is received during a video conference; and determining, based on the energy, that the target speaker is speaking and generating the voiceprint of the target speaker from the audio signal.

Example 13: The non-transitory computer readable medium of any Example 8-12, the operations further comprising, wherein determining, based on the energy, that the target speaker is speaking comprises determining that the energy exceeds a threshold.

Example 14: The non-transitory computer readable medium of any Example 8-13, the operations further comprising: generating, by a voiceprint extraction model, the voiceprint of the target speaker, wherein the voiceprint extraction model shares one or more weights with the speech separation model.

Example 15: A target speaker extraction system comprising one or more processors configured to perform the operations of: receiving, by a target speaker extraction system, an audio frame of an audio signal, the target speaker extraction system comprising a multi-speaker detection model, a target speaker voice activity detection (VAD) model, and a speech separation model; analyzing, by the multi-speaker detection model, the audio frame to determine whether the audio frame includes only a single-speaker or multiple speakers; when the audio frame includes only a single-speaker, inputting the audio frame to the target speaker VAD model to suppress speech in the audio frame from a non-target speaker based on comparing the audio frame to a voiceprint of a target speaker; and when the audio frame includes multiple speakers, inputting the audio frame to the speech separation model to separate the voice of the target speaker from a voice mixture in the audio frame.

Example 16: The system of Example 15, wherein the processors are further configured to perform the operations of: suppressing speech in the audio frame from the non-target speaker, by the target speaker VAD, based on a suppression ratio.

Example 17: The system of any Example 15-16, wherein the processors are further configured to perform the operations of: generating a voiceprint of the non-target speaker; comparing the voiceprint of the non-target speaker to the voiceprint of the target speaker to determine a similarity score; and determining the suppression ratio based on the similarity score.

Example 18: The system of any Example 15-17, wherein the processors are further configured to perform the operations of: receiving a voice recording from a target speaker prior to a video conference; generating the voiceprint of the target speaker from the voice recording prior to the video conference; and using the target speaker extraction system and the voiceprint of the target speaker to extract the voice of the target speaker during the video conference.

Example 19: The system of any Example 15-18, wherein the processors are further configured to perform the operations of: analyzing the audio signal to determine the energy of the audio signal, wherein the audio signal is received during a video conference; and determining, based on the energy, that the target speaker is speaking and generating the voiceprint of the target speaker from the audio signal.

Example 20: The system of any Example 15-19, wherein determining, based on the energy, that the target speaker is speaking comprises determining that the energy exceeds a threshold.

Some portions of the preceding detailed descriptions have been presented in terms of algorithms and symbolic representations of operations on data bits within a computer memory.

These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method for target speaker extraction, comprising:
   receiving, by a target speaker extraction system, an audio frame of an audio signal and a corresponding video, wherein the target speaker extraction system comprises a trained multi-speaker detection machine-learning ("ML") model, a trained lip-movement-based ("LM-based") target speaker voice activity detection (VAD) ML model, and a trained speech separation ML model;
   responsive to determining, by the trained multi-speaker detection ML model of the target speaker extraction system, a single speaker within the audio frame:
      inputting, by the target speaker extraction system, the audio frame and the video to the trained LM-based target speaker VAD ML model; and
      suppressing, by the trained LM-based target speaker VAD ML model of the target speaker extraction system and based on the video, speech in the audio frame from a non-target speaker, wherein suppressing the speech in the audio from a non-target speaker comprises comparing the audio frame to a voiceprint of a target speaker; and
   responsive to determining, by the trained multi-speaker detection ML model of the target speaker extraction system, a plurality of speakers within the audio frame:
      inputting, by the target speaker extraction system, the audio frame to the trained speech separation ML model; and
      separating, by the trained speech separation ML model of the target speaker extraction system, the voice of the target speaker from a voice mixture in the audio frame.

2. The method of claim 1, wherein suppressing, by the trained LM-based target speaker VAD ML model of the target speaker extraction system, speech in the audio frame from the non-target speaker further comprises:
   determining, by the trained LM-based target speaker VAD ML model of the target speaker extraction system, a suppression ratio; and
   suppressing, by the trained LM-based target speaker VAD ML model of the target speaker extraction system, the speech in the audio frame from the non-target speaker based on the suppression ratio.

3. The method of claim 2, further comprising:
   generating, by the trained LM-based target speaker VAD ML model of the target speaker extraction system, a voiceprint of the non-target speaker;
   comparing, by the trained LM-based target speaker VAD ML model of the target speaker extraction system, the voiceprint of the non-target speaker to the voiceprint of the target speaker to determine a similarity score; and determining, by the trained LM-based target speaker VAD ML model of the target speaker extraction system, the suppression ratio based on the similarity score.

4. The method of claim 1, wherein:
the method further comprises:
receiving, by the target speaker extraction system, a voice recording from a target speaker prior to a video conference; and
generating, by the target speaker extraction system, the voiceprint of the target speaker from the voice recording prior to the video conference; and
separating, by the trained speech separation ML model of the target speaker extraction system, the voice of the target speaker from the voice mixture in the audio frame further comprises:
extracting, by the trained speech separation ML model of the target speaker extraction system, the voice of the target speaker during the video conference based on the voiceprint of the target speaker.

5. The method of claim 1, further comprising:
determining, by the target speaker extraction system, an energy of the audio signal, wherein the audio signal is received during a video conference;
determining, by the target speaker extraction system, speech by the target speaker within the audio frame based on the energy of the audio signal; and
generating, by the target speaker extraction system, a voiceprint of the target speaker from the audio signal.

6. The method of claim 5, wherein determining, by the target speaker extraction system, the speech by the target speaker within the audio frame based on the energy of the audio signal comprises determining that the energy exceeds a threshold.

7. The method of claim 1, wherein the target speaker extraction system comprises a trained voiceprint extraction ML model, and the method further comprises:
generating, by the trained voiceprint extraction ML model of the target speaker extraction system, a voiceprint of the target speaker; and
sharing, by the trained voiceprint extraction ML model, one or more weights associated with the voiceprint with the trained speech separation ML model.

8. A non-transitory computer readable medium comprising processor-executable instructions configured to cause one or more processors to:
receive, by a target speaker extraction system, an audio frame of an audio signal and a corresponding video, wherein the target speaker extraction system comprises a trained multi-speaker detection machine-learning ("ML") model, a trained lip-movement-based ("LM-based") target speaker voice activity detection (VAD) ML model, and a trained speech separation ML model;
responsive to determining, by the trained multi-speaker detection ML model of the target speaker extraction system, a single speaker within the audio frame:
input, by the target speaker extraction system, the audio frame and the video to the trained LM-based target speaker VAD ML model; and
suppress, by the trained LM-based target speaker VAD ML model of the target speaker extraction system and based on the video, speech in the audio frame from a non-target speaker, wherein suppressing the speech in the audio from a non-target speaker comprises comparing the audio frame to a voiceprint of a target speaker; and responsive to determining, by the trained multi-speaker detection ML model of the target speaker extraction system, a plurality of speakers within the audio frame:
input, by the target speaker extraction system, the audio frame to the trained speech separation ML model; and
separate, by the trained speech separation ML model of the target speaker extraction system, the voice of the target speaker from a voice mixture in the audio frame.

9. The non-transitory computer readable medium of claim 8, further comprising processor-executable instructions configured to cause the one or more processors to:
determine, by the trained LM-based target speaker VAD ML model of the target speaker extraction system, a suppression ratio; and
suppress, by the trained LM-based target speaker VAD ML model of the target speaker extraction system, the speech in the audio frame from the non-target speaker based on the suppression ratio.

10. The non-transitory computer readable medium of claim 9, further comprising processor-executable instructions configured to cause the one or more processors to:
generate, by the trained LM-based target speaker VAD ML model of the target speaker extraction system, a voiceprint of the non-target speaker;
compare, by the trained LM-based target speaker VAD ML model of the target speaker extraction system, the voiceprint of the non-target speaker to the voiceprint of the target speaker to determine a similarity score; and
determine, by the trained LM-based target speaker VAD ML model of the target speaker extraction system, the suppression ratio based on the similarity score.

11. The non-transitory computer readable medium of claim 8, further comprising processor-executable instructions configured to cause the one or more processors to:
receive, by the target speaker extraction system, a voice recording from a target speaker prior to a video conference; and
generate, by the target speaker extraction system, the voiceprint of the target speaker from the voice recording prior to the video conference; and
extract, by the trained speech separation ML model of the target speaker extraction system, the voice of the target speaker during the video conference based on the voiceprint of the target speaker.

12. The non-transitory computer readable medium of claim 8, further comprising processor-executable instructions configured to cause the one or more processors to:
determining, by the target speaker extraction system, an energy of the audio signal, wherein the audio signal is received during a video conference;
determining, by the target speaker extraction system, speech by the target speaker within the audio frame based on the energy of the audio signal; and
generating, by the target speaker extraction system, a voiceprint of the target speaker from the audio signal.

13. The non-transitory computer readable medium of claim 12, wherein the processor-executable instructions configured to cause the one or more processors to determine, by the target speaker extraction system, the speech by the target speaker within the audio frame based on the energy of the audio signal further comprise further comprise processor-executable instructions configured to cause the one or more processors to determine that the energy exceeds a threshold.

14. The non-transitory computer readable medium of claim 8, wherein the target speaker extraction system comprises a trained voiceprint extraction ML model, and further comprising processor-executable instructions configured to cause the one or more processors to:

generate, by the trained voiceprint extraction ML model of the target speaker extraction system, a voiceprint of the target speaker; and share, by the trained voiceprint extraction ML model, one or more weights associated with the voiceprint with the trained speech separation ML model.

15. A target speaker extraction system comprising:

a non-transitory computer-readable medium; and one or more processors communicatively coupled to the non-transitory computer-readable medium, the one or more processors configured to execute processor-executable instructions stored in the non-transitory computer-readable medium to:

receive, by a target speaker extraction system, an audio frame of an audio signal and a corresponding video, wherein the target speaker extraction system comprises a trained multi-speaker detection machine-learning ("ML") model, a trained lip-movement-based ("LM-based") target speaker voice activity detection (VAD) ML model, and a trained speech separation ML model;

responsive to determining, by the trained multi-speaker detection ML model of the target speaker extraction system, a single speaker within the audio frame:

input, by the target speaker extraction system, the audio frame and the video to the trained LM-based target speaker VAD ML model; and suppress, by the trained LM-based target speaker VAD ML model of the target speaker extraction system and based on the video, speech in the audio frame from a non-target speaker, wherein suppressing the speech in the audio from a non-target speaker comprises comparing the audio frame to a voiceprint of a target speaker; and responsive to determining, by the trained multi-speaker detection ML model of the target speaker extraction system, a plurality of speakers within the audio frame:

input, by the target speaker extraction system, the audio frame to the trained speech separation ML model; and separate, by the trained speech separation ML model of the target speaker extraction system, the voice of the target speaker from a voice mixture in the audio frame.

16. The system of claim 15, wherein the one or more processors are configured to execute further processor-executable instructions stored in the non-transitory computer-readable medium to-further configured to determine, by the trained LM-based target speaker VAD ML model of the target speaker extraction system, a suppression ratio; and suppress, by the trained LM-based target speaker VAD ML model of the target speaker extraction system, the speech in the audio frame from the non-target speaker based on the suppression ratio.

17. The system of claim 16, wherein the one or more processors are configured to execute further processor-executable instructions stored in the non-transitory computer-readable medium to:

generate, by the trained LM-based target speaker VAD ML model of the target speaker extraction system, a voiceprint of the non-target speaker;

compare, by the trained LM-based target speaker VAD ML model of the target speaker extraction system, the voiceprint of the non-target speaker to the voiceprint of the target speaker to determine a similarity score; and determine, by the trained LM-based target speaker VAD ML model of the target speaker extraction system, the suppression ratio based on the similarity score.

18. The system of claim 15, wherein the one or more processors are configured to execute further processor-executable instructions stored in the non-transitory computer-readable medium to:

receive, by the target speaker extraction system, a voice recording from a target speaker prior to a video conference; and generate, by the target speaker extraction system, the voiceprint of the target speaker from the voice recording prior to the video conference; and extract, by the trained speech separation ML model of the target speaker extraction system, the voice of the target speaker during the video conference based on the voiceprint of the target speaker.

19. The system of claim 15, wherein the one or more processors are configured to execute further processor-executable instructions stored in the non-transitory computer-readable medium to further configured to:

determine, by the target speaker extraction system, an energy of the audio signal, wherein the audio signal is received during a video conference;

determine, by the target speaker extraction system, speech by the target speaker within the audio frame based on the energy of the audio signal; and generate, by the target speaker extraction system, a voiceprint of the target speaker from the audio signal.

20. The system of claim 19, wherein the one or more processors are configured to execute further processor-executable instructions stored in the non-transitory computer-readable medium to determine, by the target speaker extraction system, the speech by the target speaker within the audio frame based on the energy of the audio signal exceeding a threshold.

\* \* \* \* \*